US011762951B2

(12) United States Patent
Shechtman et al.

(10) Patent No.: US 11,762,951 B2
(45) Date of Patent: Sep. 19, 2023

(54) GENERATIVE IMAGE CONGEALING

(71) Applicant: Adobe Inc., San Jose, CA (US)

(72) Inventors: Elya Shechtman, Seattle, WA (US); William Peebles, Apex, NC (US); Richard Zhang, San Francisco, CA (US); Jun-Yan Zhu, Pittsburgh, PA (US); Alyosha Efros, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 330 days.

(21) Appl. No.: 16/951,782

(22) Filed: Nov. 18, 2020

(65) Prior Publication Data
US 2022/0156522 A1 May 19, 2022

(51) Int. Cl.
*G06F 18/21* (2023.01)
*G06N 3/08* (2023.01)
*G06T 3/00* (2006.01)
*G06F 18/214* (2023.01)
*G06N 3/045* (2023.01)

(52) U.S. Cl.
CPC .......... *G06F 18/217* (2023.01); *G06F 18/214* (2023.01); *G06N 3/045* (2023.01); *G06N 3/08* (2013.01); *G06T 3/0068* (2013.01)

(58) Field of Classification Search
CPC .. G06K 9/6262; G06K 9/6256; G06N 3/0454; G06N 3/08; G06N 3/088; G06N 20/00; G06T 3/0068; G06T 1/20; G06T 5/006; G06T 2207/20081; G06T 2207/20084; G06V 10/24; G06V 10/82
See application file for complete search history.

(56) References Cited

U.S. PATENT DOCUMENTS

| 10,699,456 | B2 * | 6/2020 | Theis ........................ G06T 5/50 |
| 11,030,782 | B2 * | 6/2021 | Ayush ................... G06N 3/0454 |
| 11,185,249 | B2 * | 11/2021 | Schlemper ............. A61B 5/055 |
| 11,361,189 | B2 * | 6/2022 | Gou ..................... G06K 9/6257 |
| 11,393,574 | B1 * | 7/2022 | Ceballos Lentini ... G16H 50/50 |

(Continued)

OTHER PUBLICATIONS

Goodfellow, I.J. et al., "Generative Adversarial Nets," Advances in Neural Information Processing Systems 27 (NIPS 2014), Dec. 2014, pp. 1-9.

(Continued)

*Primary Examiner* — Lewis G West
(74) *Attorney, Agent, or Firm* — NICHOLSON DE VOS WEBSTER & ELLIOTT LLP

(57) ABSTRACT

Embodiments are disclosed for generative image congealing which provides an unsupervised learning technique that learns transformations of real data to improve the image quality of GANs trained using that image data. In particular, in one or more embodiments, the disclosed systems and methods comprise generating, by a spatial transformer network, an aligned real image for a real image from an unaligned real dataset, providing, by the spatial transformer network, the aligned real image to an adversarial discrimination network to determine if the aligned real image resembles aligned synthetic images generated by a generator network, and training, by a training manager, the spatial transformer network to learn updated transformations based on the determination of the adversarial discrimination network.

20 Claims, 15 Drawing Sheets

(56) References Cited

U.S. PATENT DOCUMENTS

| | | | |
|---|---|---|---|
| 11,393,575 B1* | 7/2022 | Ceballos Lentini | G16H 30/40 |
| 11,501,438 B2* | 11/2022 | Xu | G06F 17/18 |
| 2018/0225823 A1* | 8/2018 | Zhou | G06V 30/19173 |
| 2019/0066281 A1* | 2/2019 | Zheng | G06T 5/006 |
| 2019/0205766 A1* | 7/2019 | Krebs | G06T 7/0012 |
| 2019/0251401 A1* | 8/2019 | Shechtman | G06V 30/19173 |
| 2019/0279009 A1* | 9/2019 | Srirangam Narashiman | G06T 7/74 |
| 2019/0333198 A1* | 10/2019 | Wang | G06T 5/50 |
| 2020/0120233 A1* | 4/2020 | Annunziata | G06V 10/82 |
| 2020/0146635 A1* | 5/2020 | Wang | A61B 5/055 |
| 2020/0193607 A1* | 6/2020 | Sun | G06V 10/255 |
| 2020/0226421 A1* | 7/2020 | Almazan | G06V 20/52 |
| 2020/0242736 A1* | 7/2020 | Liu | G06T 11/60 |
| 2020/0364864 A1* | 11/2020 | Shanbhag | G06T 7/0012 |
| 2020/0394413 A1* | 12/2020 | Bhanu | G06V 40/23 |
| 2020/0394459 A1* | 12/2020 | Xu | G06N 3/0472 |
| 2020/0394790 A1* | 12/2020 | Kaethner | G06V 10/30 |
| 2021/0081727 A1* | 3/2021 | Ansari | G06T 7/90 |
| 2021/0142539 A1* | 5/2021 | Ayush | G06T 3/0093 |
| 2021/0166073 A1* | 6/2021 | Gou | G06V 10/774 |
| 2021/0249142 A1* | 8/2021 | Lau | G06T 7/11 |
| 2021/0275918 A1* | 9/2021 | Devaranjan | G06V 10/25 |
| 2021/0334935 A1* | 10/2021 | Grigoriev | G06N 3/08 |
| 2022/0138500 A1* | 5/2022 | Levinshtein | G06N 3/0454 382/159 |
| 2022/0172452 A1* | 6/2022 | Wang | G06V 10/52 |
| 2022/0232162 A1* | 7/2022 | Gupta | G06F 16/538 |
| 2022/0309672 A1* | 9/2022 | Cherian | G06T 7/11 |
| 2022/0309762 A1* | 9/2022 | Zhao | G06K 9/6282 |

OTHER PUBLICATIONS

Karras, T. et al., "Analyzing and Improving the Image Quality of StyleGAN," Analyzing and Improving the Image Quality of StyleGAN, 2020 IEEE/CVF Conference on Computer Vision and Pattern Recognition (CVPR), Jun. 2020, pp. 8107-8116.

Karras, T. et al., "Training Generative Adversarial Networks with Limited Data," arXiv:2006.06676v2 [cs.CV], Oct. 7, 2020, pp. 1-37.

Learned-Miller, E.G., "Data Driven Image Models through Continuous Joint Alignment," IEEE Transactions on Pattern Analysis and Machine Intelligence, vol. 28, No. 2, Feb. 2006, pp. 236-250.

Lin, C.-H. et al., "ST-GAN: Spatial Transformer Generative Adversarial Networks for Image Compositing," 2018 IEEE/CVF Conference on Computer Vision and Pattern Recognition, Jun. 2018, pp. 9455-9464.

Xing, X. et al., "Deformable Generator Networks: Unsupervised Disentanglement of Appearance and Geometry," arXiv:1806.06298v3 [cs.LG], Jan. 14, 2020, pp. 1-17.

Zhao, S. et al., "Differentiable Augmentation for Data-Efficient GAN Training," arXiv:2006.10738v4 [cs.CV], Dec. 7, 2020, pp. 1-23.

Office Action, GB App. No. 2113083.6, dated Mar. 9, 2023, 4 pages.

* cited by examiner

GENERATIVE IMAGE CONGEALING

BACKGROUND

Technical Field

The present disclosure relates generally to systems and method for data preparation for training machine learning models. More specifically, one or more embodiments of the present disclosure relate to systems and methods for generative image congealing.

Background and Relevant Art

Generative Adversarial Networks (GANs) are a type of machine learning technique which learn to generate new data that is similar to the data on which it was trained. For example, a GAN trained on images of cats will generate new images of cats. The image quality of GANs has improved at a meteoric pace in recent years. However, most GANs are usually trained on aligned visual data. When trained using an arbitrarily unaligned distribution of images, the resulting GAN suffers from a substantial degradation in image quality, even for state-of-the-art models such as StyleGAN-v2. Manual alignment of images involves substantial costs and extensive human supervision. Additionally, manual alignment is typically performed heuristically (e.g., in whatever way appears best aligned to the human performing the alignment). However, it is unclear as to whether such choice of alignment is the best alignment for a given dataset.

These and other problems exist with regard to training GANs.

BRIEF SUMMARY

Introduced here are techniques/technologies for generative image congealing which provides an unsupervised learning technique that learns transformations to align real data to be used to train generative adversarial networks (GANs). In particular, in one or more embodiments, the disclosed systems and methods train a spatial transformer network, which is a type of neural network capable of performing geometric transformations on images, to align real image data with aligned synthetic image data. For example, a generative adversarial network trained on unaligned image data learns to generate synthetic images that resemble the distribution of the unaligned image data it was trained on. GANs trained on unaligned data generally underperform GANs trained on aligned data, resulting in synthetic images that are not as visually pleasing. The input to a GAN is random noise sampled from some prior distribution. If the input random noise provided to a GAN trained on unaligned data is biased towards the mean of the prior distribution, the GAN produces higher fidelity synthetic images at the cost of reduced diversity. One consequence of this reduced diversity is that the synthetic images generated by the GAN in response to biased input noise are similarly aligned.

Embodiments take advantage of this to generate a synthetic aligned dataset. Using the synthetic aligned dataset, the spatial transformer network is adversarially trained to learn transformations that make the transformed real image data indistinguishable from the aligned synthetic data, as determined by a discriminator network. Once trained, the spatial transformer network is capable of aligning the real image data used to train the GAN to produce an aligned real image dataset, without the extensive human supervision typically required to manually align a dataset. The aligned real image dataset is then available to train a new GAN, or fine-tune the existing GAN, resulting in a better performing GAN.

Additional features and advantages of exemplary embodiments of the present disclosure are set forth in the description which follows, and in part are obvious from the description, or are learned by the practice of such exemplary embodiments.

BRIEF DESCRIPTION OF THE DRAWINGS

The detailed description is described with reference to the accompanying drawings in which.

DETAILED DESCRIPTION

Figure 1:
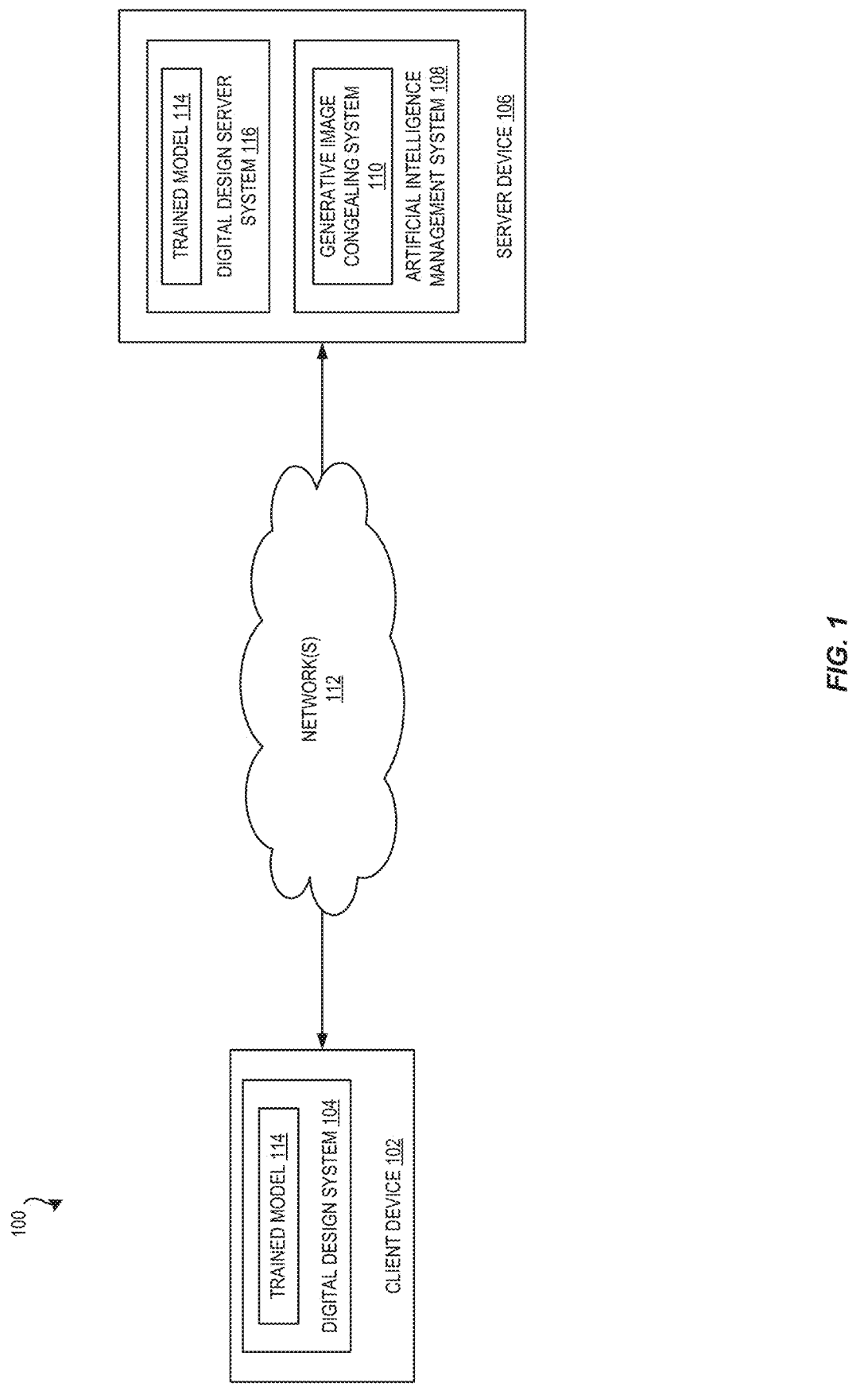
FIG. 1 illustrates an example environment in which generative image congealing is performed in accordance with one or more embodiments.

One or more embodiments of the present disclosure include a generative image congealing system which provides an unsupervised learning technique that learns transformations of real data to improve the image quality of GANs trained using that image data. For example, a generator network that has been trained on unaligned data is used to generate synthetic images (e.g., "fake image data"). The input to the generator network that is used by the generator network when generating the synthetic image data is biased such that the generator network produces images from a dominant mode of the data on which it was trained. This results in a set of synthetic image data having a similar alignment, which will vary depending on the distribution of the dataset used to train the generator network (e.g., a "generator model," or "generator"). A spatial transformation network obtains unaligned real data and attempts to generate aligned data that looks like the synthetic image data produced by the generator network. A discriminator model (e.g., an "adversarial discrimination network," or "discriminator") receives the image data generated by the spatial transformation network and the generator network and attempts to determine which is real and which is synthetic. Based on this determination, the spatial transformation network is updated.

As discussed, GANs trained on unaligned data significantly underperform GANs trained on aligned data. In conventional systems, the process of aligning training datasets is costly and requires extensive supervision. However, using techniques described herein, a spatial transformation network is trained in an unsupervised manner to automatically generate aligned data. For example, once the spatial transformation network has been trained as discussed, the spatial transformation network has learned to align image data. Subsequently, the spatial transformation network receives an unaligned dataset and outputs a corresponding aligned (e.g., "congealed") dataset. The aligned dataset is then available to be used to train a new GAN or fine-tune an existing GAN, improving the performance of the GAN without the cost associated with manually aligning a training dataset. Further, in some embodiments, the generator network of the newly trained GAN is used to train an improved spatial transformation network, which produces a better aligned dataset which in turn enables a further improved GAN to be trained.

Conventional systems have incorporated spatial transformer networks in generative models. However, these conventional systems only used spatial transformer networks as a layer in generator networks. Additionally, other conventional systems have transformed real data to improve GAN performance. However, such systems require human input to perform the transformations and have not been shown to improve performance on datasets that have substantial diversity. Unlike past systems, embodiments apply a spatial transformer network to training data to narrow the distribution of images the generator must learn by automatically transforming the dataset. This is applicable to both simple and complex datasets as the alignment of the dataset is learned by the spatial alignment network without additional user input. Instead, the alignment is learned based on a dominant mode of the training data. As such, complex datasets that do not have an obvious best alignment to a human reviewer are aligned based on the dominant mode of the data, rather than heuristically or through other arbitrary decisions.

Term Definitions

As used herein, the term "digital visual media" refers to digital data capable of producing a visual representation. For instance, the term "digital visual media" includes digital images and digital video.

As used herein, the term "digital image" or "image" refers to any digital symbol, picture, icon, or illustration. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device.

As used herein, the term "neural network" refers to a machine learning model that is tuned (e.g., trained) based on inputs to approximate unknown functions. In some embodiments, the term neural network includes a model of interconnected neurons that communicate and learn to approximate complex functions and generate outputs based on a plurality of inputs provided to the model. For instance, the term neural network includes one or more machine learning algorithms. In some embodiments, the term neural network includes deep convolutional neural networks (i.e., "CNNs"), such as a spatial transformer network (STN). In addition, a neural network is an algorithm (or set of algorithms) that implements deep learning techniques that utilize the algorithm to model high-level abstractions in data. The description and figures below generally refer to a CNN, which includes lower layers, higher layers, and loss layers. The spatial transformer network, in various embodiments, is a type of CNN capable of performing geometric transformations on images.

As used herein, the term "adversarial learning" refers to a machine-learning algorithm (e.g., generative adversarial network or adversarial discrimination neural network) where opposing learning models are learned together. For example, a "generative adversarial neural network" (or simply "generative adversarial network" (GAN)) includes a generator network and a discriminator network (e.g., an "adversarial discrimination neural network"). In particular, the term "adversarial learning" includes solving a plurality of learning tasks in the same model (e.g., in sequence or in parallel) while utilizing the roles and constraints across the tasks. In some embodiments, adversarial learning includes employing a loss function which is minimized with respect to one model and maximized with respect to the adversarial model. For example, the image congealing system employs adversarial learning to minimize the adversarial loss of an STN and maximize the adversarial loss of a discriminator model. This is used to train the STN to transform a dataset to more closely resemble the output of a generator network.

FIG. 1 illustrates an example environment in which generative image congealing is performed in accordance with one or more embodiments. As illustrated in FIG. 1, the environment 100 includes the client device 102 having digital design system 104. The digital design system 104 generally facilitates the creation, modification, sharing, and/or deletion of graphical content including raster-based content. In one or more embodiments, the digital design system 104 is a design application such as ADOBE® PHOTOSHOP®. In other embodiments, the digital design system 104 includes multiple applications, functions, and operations relating to graphical content, such as an application suite, a web-based application, and/or system operations on the client device 102.

In addition, the environment 100 includes the server device 106. The server device 106 generates, stores, receives, and/or transmits any type of data, including digital visual media. As shown, the server device 106 includes an artificial intelligence management system 108 that communicates with the digital design system 104 on the client device 102. For example, the artificial intelligence management system 108 uses its components to generate, train, and apply machine learning models. For example, the artificial intelligence management system 108 includes generative image congealing system 110. As discussed further herein, the generative image congealing system 110 learns to align (e.g., "congeal") data in an unsupervised fashion using adversarial learning. This includes training a STN to transform input real data to more closely resemble data generated by a generator network. Once the STN has been trained, it is used to align an unaligned training dataset to generate an aligned training dataset. The artificial intelligence management system 108 uses the aligned training dataset to train a new GAN or fine-tune an existing GAN.

This newly trained GAN (e.g., trained model 114) is deployed to digital design system 104 or to a digital design server system 116 In one or more embodiments, the server device 106 includes all, or a portion of, the digital design system 104, such as within the digital design server system 116. For example, when located in the server device 106, the digital design system 104 comprises an application running on the server device 106 or a portion of a software application that is downloadable to the client device 102 over one or more networks 112. For instance, in some embodiments, the digital design system 104 includes a web hosting application that allows the client device 102 to interact with content from the digital design server system 116 hosted at the server device 106. In this manner, in some embodiments, the server device 106 uses the trained model in connection with digital visual media based on inputs received from a designer using client device 102.

Figure 2:
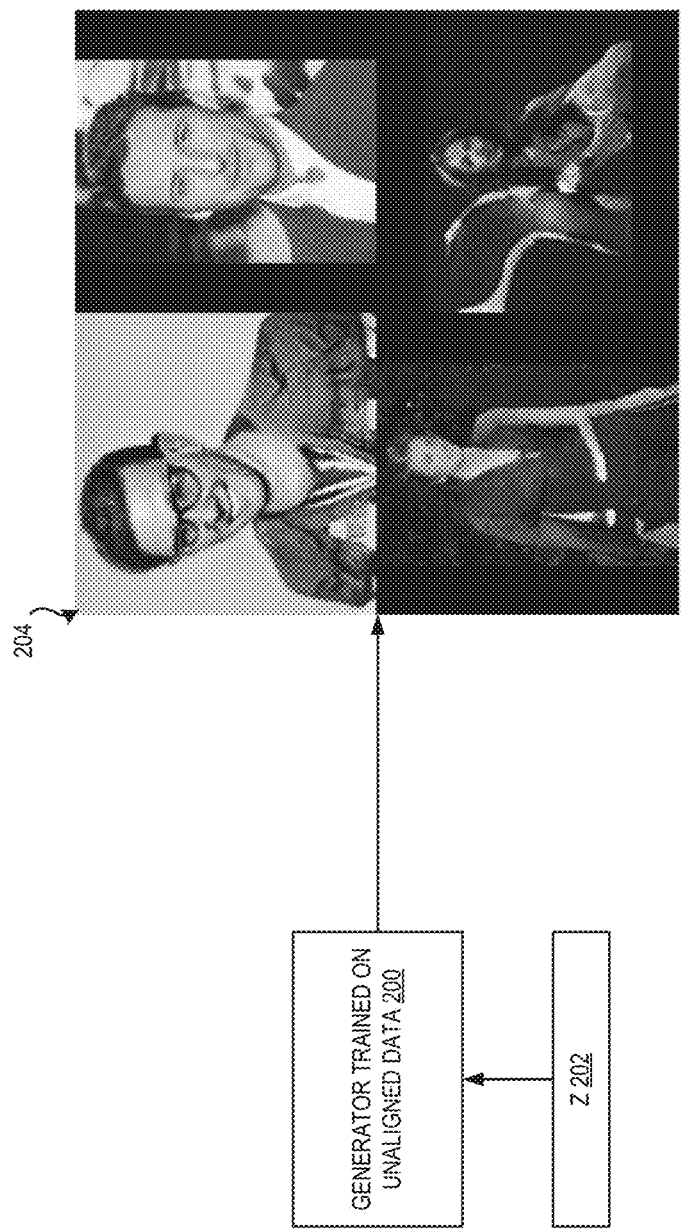
FIG. 2 illustrates an example of a generator network trained on unaligned data in accordance with one or more embodiments.

FIG. 2 illustrates an example of a generator network trained on unaligned data in accordance with one or more embodiments. As discussed, a GAN generates new data that resembles the data it was trained on. For example, in the embodiment of FIG. 2, a generator 200 has been trained on headshot image data. The training dataset included paparazzi-style headshots of celebrities, such as are available in the CelebA dataset. As these images are captured in the real world under conditions in which the photographers had limited control over the environment or the object of the photographs, the images include representations of people in various poses and from various angles. The dataset was not manually aligned, instead the unaligned dataset was used to train the GAN.

To generate new data, the generator of the GAN rained on unaligned data is given an input, z 202. The input (e.g., input latent vectors) is typically random noise. In this example, the training dataset used is extremely challenging for the GAN to learn, not least of which is because of it being unaligned. This forces the GAN to model a much wider distribution of data than if the training data were aligned. As shown at 204, the output of a GAN trained on unaligned data is generally visually poor. GANs are well known to suffer from mode dropping, a situation where the generator produces samples from a (usually small) subset of modes from the underlying real distribution. However, even when trained on extremely challenging distributions of data, the GAN is able to learn at least some mode of the data. For example, the upper right output image is a relatively coherent generated image. This mode or modes which the generator is able to produce reasonably well will generally look similar. Generating a lot of output data that looks similar is generally a sign of a poorly functioning GAN. However, embodiments take advantage of this problem to automatically generate aligned data that is representative of at least one mode of the training data.

Figure 3:
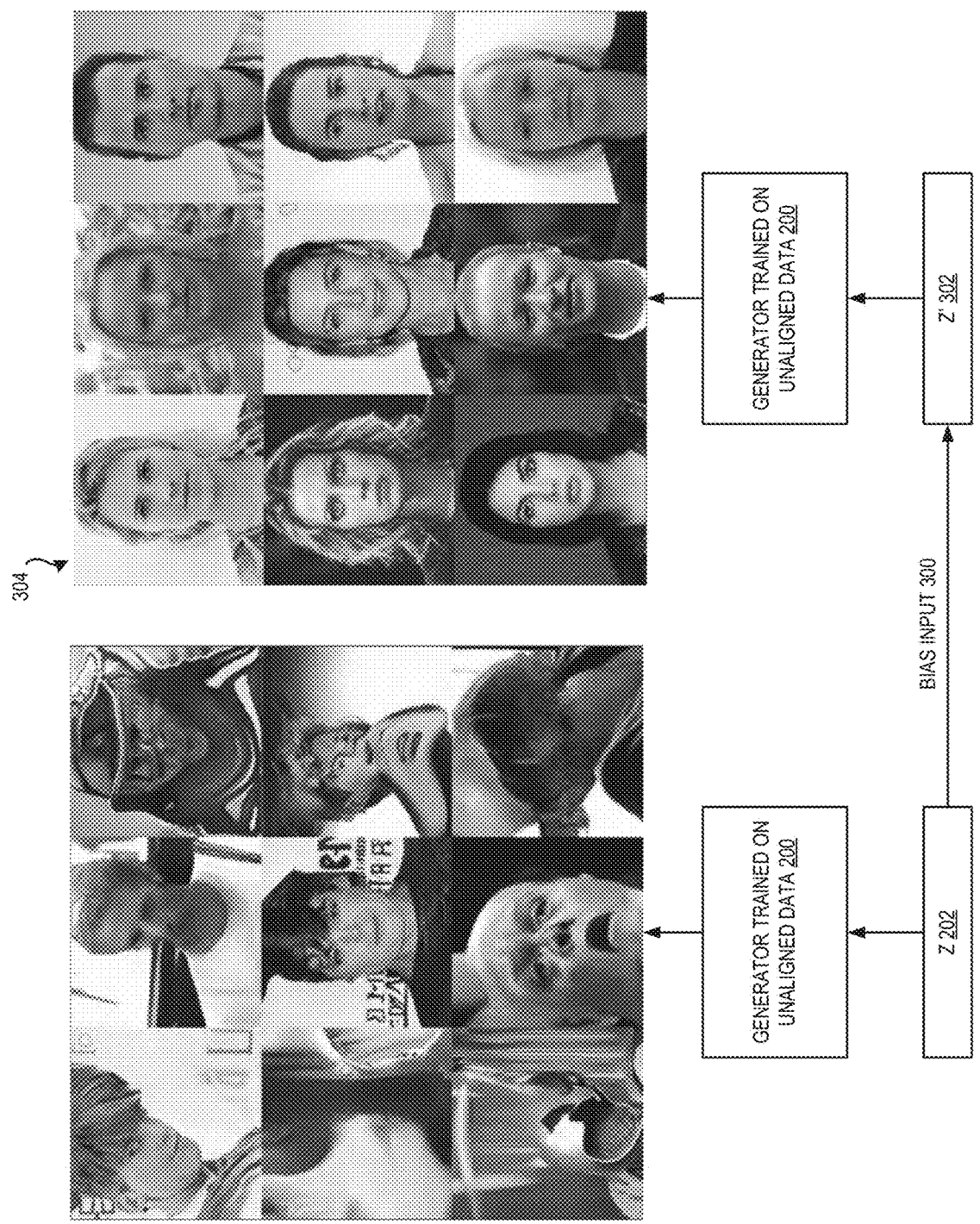
FIG. 3 illustrates an example of changes in generated images due to biasing of input data in accordance with one or more embodiments.

FIG. 3 illustrates an example of changes in generated images due to biasing of input data in accordance with one or more embodiments. As shown in FIG. 3, rather than generating an image based on random input 202, the input 300 is biased to produce biased input, z' 300. When biased input 300 is provided to generator 200, it results in an output image dataset 304 which is a significant visual improvement over output image 306 produced by unbiased input 202. For example, in some embodiments, the input is biased using what is referred to as "the truncation trick." It is known that by biasing input latent vectors z towards "high probability" regions of $p_z$, one increases the image quality of samples at the expense of decreased diversity. This enables the GAN trained on unaligned image data to generate higher quality output images at the expense of those output images belonging to the dominant mode which it has learned. For example, for an input vector z, any values with magnitudes above a threshold value are resampled until they are below the threshold value. The highest fidelity output images are obtained when the input is biased toward the mean of the distribution of the input random numbers. For example, where the input distribution typically varies in values between −1 and 1, the highest fidelity results are obtained when the input is biased to be close to zero.

As noted, this fidelity comes at the expense of diversity. As a result, the output images are visually similar. However, unlike typical systems, this limited output range is helpful. For example, using this technique, the generator 200 trained on unaligned training data is able to produce an aligned generated dataset. As the resulting output images appear visually similar, they are all similarly aligned. For example, each image in the output image dataset 304 shows roughly the same portion of a person (e.g., headshots), with each image depicting a person in a similar pose. Accordingly, this output dataset is able to be used to train a STN to similarly align real images. Although embodiments are discussed with respect to synthetically generating aligned data, in some embodiments aligned data is obtained via a different algorithm, such as a manual or supervised technique.

Figure 4:
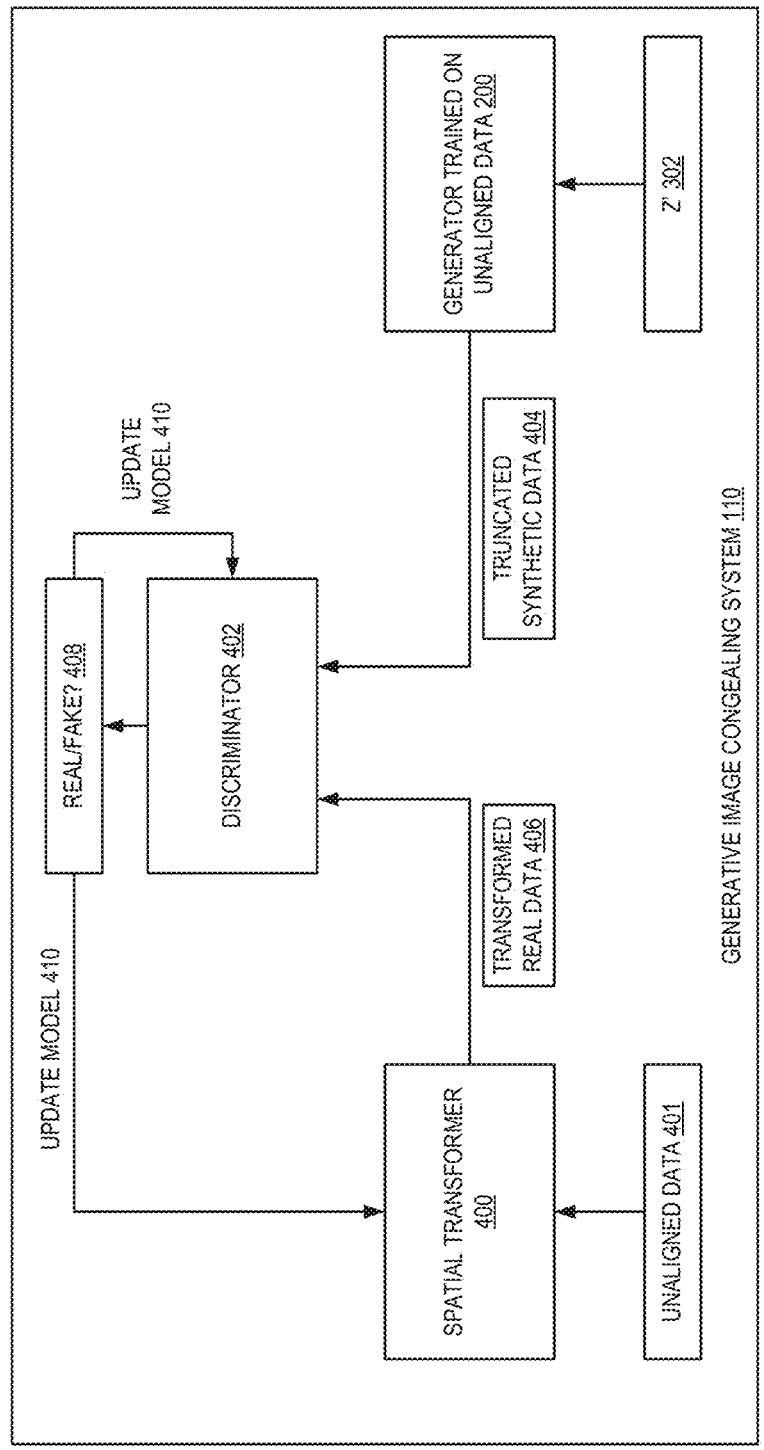
FIG. 4 illustrates a diagram of a generative image congealing system in accordance with one or more embodiments.

FIG. 4 illustrates a diagram of a generative image congealing system in accordance with one or more embodiments. As shown in FIG. 4, generative image congealing system 110 includes the generator 200 which has been trained on the unaligned dataset, a spatial transformer 400 and a discriminator 402. As discussed, in some embodiments the spatial transformer 400 is a spatial transformer network which is a type of neural network, such as a convolutional neural network, capable of performing geometric transformations on images. In various embodiments, the spatial transformer networks described herein include any network capable of receiving an image as input and outputting a new spatially transformed image as output. The geometric transformations include at least one or more of translation, scaling, rotation, etc. In some embodiments, the spatial transformer 400 is further capable of warping and cropping input images in arbitrary ways.

In the example of FIG. 4, generator 200 produces truncated synthetic data 404 based on biased input z' 302. As discussed, the truncated synthetic data 404 represents data generated by the generator with a higher fidelity, though lower diversity, as a result of biasing the input z' in favor of the portions of the input space that correspond to the modes that have been best learned by the generator. Examples of truncated synthetic data 4040 are described above at least with respect to images 304 of FIG. 3.

Spatial transformer 400 receives unaligned data and applies one or more transformations to the unaligned data to make it appear similar to the truncated synthetic data 404. As discussed, the unaligned data 401 was used to train generator 200. Although the example described with respect to FIG. 4 uses the same dataset that was used to train generator 200, in various embodiments the unaligned data is any dataset having a similar distribution to the dataset used to train generator 200. For example, if generator 200 is trained on images of cats, then the unaligned data 401 also should include images of cats.

Discriminator 402 (e.g., the adversarial discrimination neural network) receives the transformed real data 406 and the truncated synthetic data 404 one at a time and makes a determination 408 as to whether the data it receives is real or synthetic.

A typical GAN comprises a generator (G) and a discriminator (D). The Wasserstein GAN objective for such a system is:

$$\mathcal{L}_{adv}(G,D) = \mathbb{E}_x D(x) - \mathbb{E}_z D(G(z))$$

where x refers to an instance of unaligned real data, such as an image, and $z \sim p_z(z)$ is a sample from the prior distribution on which G is built. In this example, $\mathcal{L}_{adv}$ is minimized with respect to G and maximized with respect to D. In this formulation, the distribution of real data is fixed.

However, embodiments incorporate a spatial transformer network, T, such that the formulation becomes:

$$\mathcal{L}_{adv}(G,D) = \mathbb{E}_x D(T(x)) - \mathbb{E}_z D(G(z))$$

In this example, T learns transformations to bring the distribution of x closer to G(z). For example, if G has been trained to generate individuals in a portrait pose using an unaligned dataset, then when T processes a real image x of a person, it is incentivized to zoom-in (e.g., crop) the input image such that it now features a portrait pose. In practice, naively minimizing the above equation with respect to T leads to extremely degenerate solutions where, for example, T zooms-in on a single pixel, making G's job trivial. Thus, we first aim to find a "good" T that implicitly minimizes the above equation but is not degenerate. For example, the STN, in some embodiments, is limited in the operations it is configured to perform to reduce the chance of finding degenerate solutions. In some embodiments, such restrictions include a minimum crop size (e.g., as measured in pixels or relative to the size of the input image) that the STN is configured to perform, or other restrictions on the transformations that the STN is configured to perform. In some embodiments, these restrictions manifest as soft regularization terms rather than explicit restrictions on the transformations.

Based on the determinations 408 made by discriminator 402, the spatial transformer 400 and the discriminator are updated 410. For example, the discriminator is trained for a number of epochs while the spatial transformer is held constant, then the spatial transformer is trained for a number of epochs while the discriminator is trained. This process continues until convergence is reached. This results in training the spatial transformer such that it produces transformed real images T(x) that are indistinguishable from the generator's truncated distribution by the discriminator. This problem is represented by the following GAN formulation:

$$\mathcal{L}_{adv}(T,D) = \mathbb{E}_x D(T(x)) - \mathbb{E}_{z \sim p_{truncated}(z)} D(G(z))$$

As discussed, the generator, G, is already trained. As a result, only spatial transformer T and discriminator D are being trained. Since T belongs to a heavily restricted function class (e.g., T is configured to perform a limited number of transforms on an input image), the only way T produces images that look similar to the synthetic images is to learn transformations that align input image x to the same pose of objects produced by G in its truncated modes. As a result, spatial transformer 400 is trained to output aligned images, where the alignment corresponds to the alignment of the truncated modes output by the generator.

Figure 5:
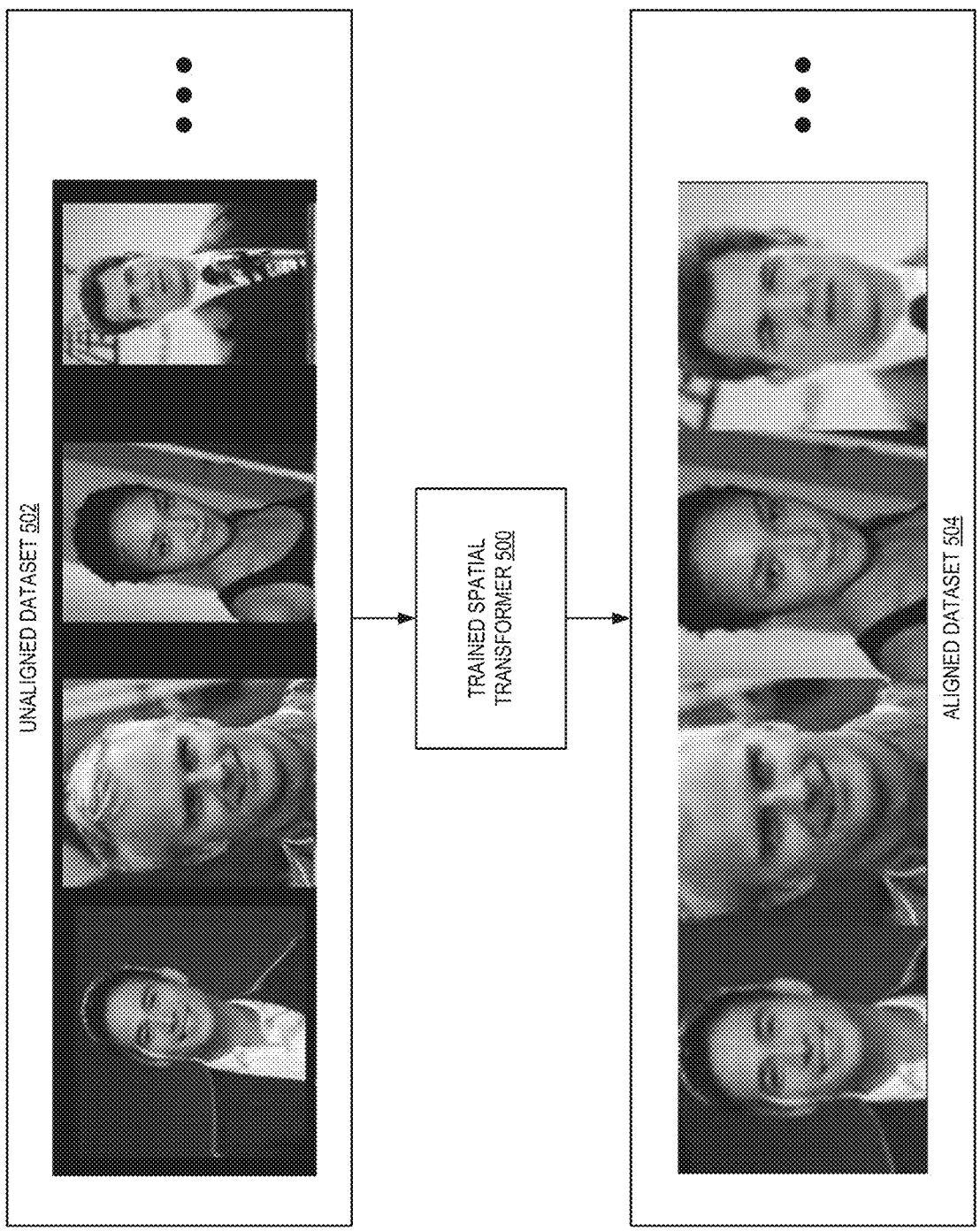
FIG. 5 illustrates an example of aligning unaligned datasets using a trained spatial transformer in accordance with one or more embodiments.

FIG. 5 illustrates an example of aligning unaligned datasets using a trained spatial transformer in accordance with one or more embodiments. As shown in FIG. 5, the trained spatial transformer 500 is available to align input data to generate an aligned dataset. For example, the trained spatial transformer 400, in some embodiments, aligns the training dataset 502 used to train generator 200. Using the transforms that were learned during training, the trained spatial transformer 500 generates aligned dataset 504. The resulting aligned dataset 504 is then usable to train or fine-tune a new GAN which will perform better than the existing generator because the distribution of the aligned training dataset is narrower, and therefore easier to learn, than the unaligned dataset.

Figure 6:
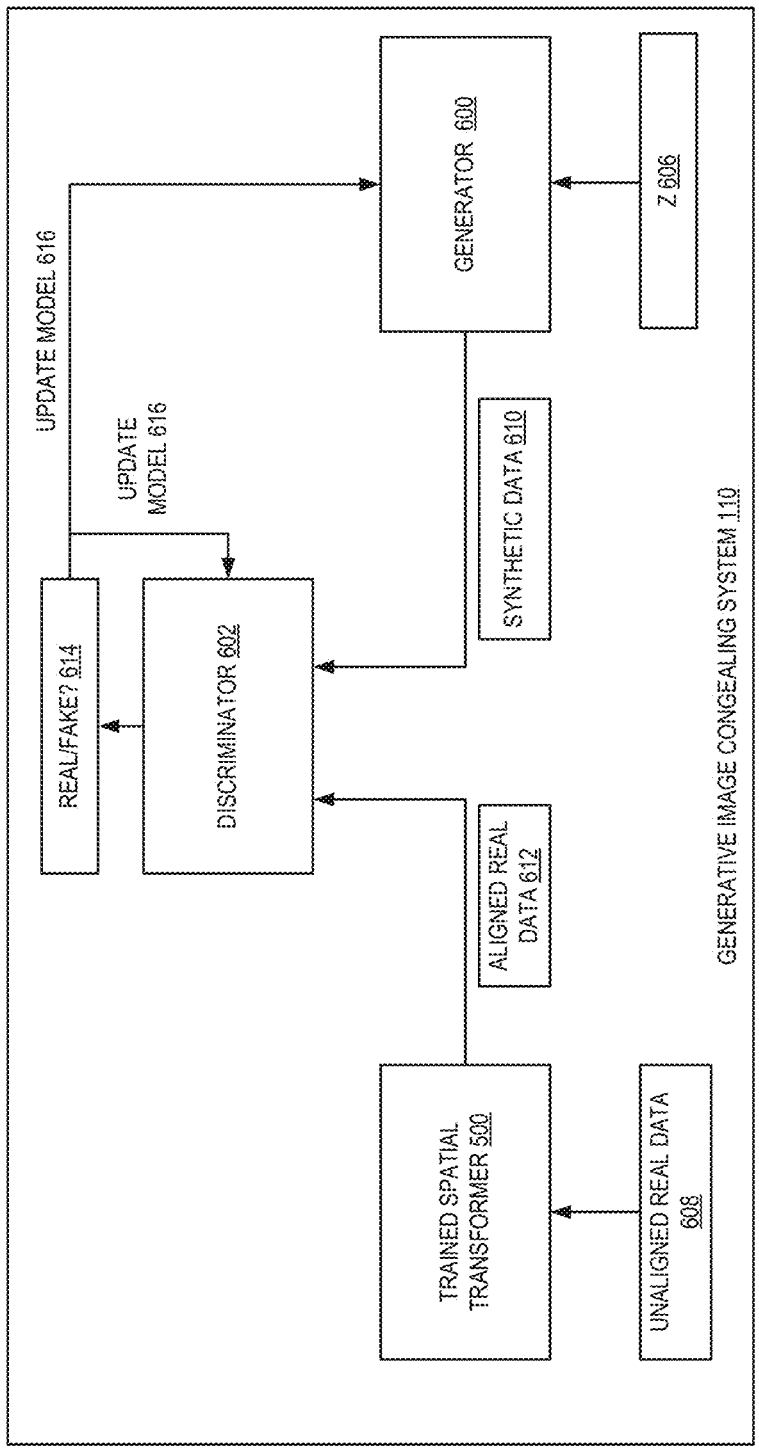
FIG. 6 illustrates an example of training a GAN using aligned data generated by a spatial transformer network in accordance with one or more embodiments.

FIG. 6 illustrates an example of training a GAN using aligned data generated by a spatial transformer network in accordance with one or more embodiments. As shown in FIG. 6, generative image congealing system 110 includes the generator 600, a trained spatial transformer 500 which has been trained to align data, and a discriminator 602. As discussed, a GAN trained on aligned data produces synthetic images of higher fidelity than a GAN trained on unaligned data. Aligning data is typically performed manually which is both time consuming and expensive. Additionally, manual alignment is typically arbitrary and does not necessarily reflect the alignment of any of the modes of the dataset. However, as discussed above, by using a trained spatial transformer network 500 that has been trained to align data, an improved generator 600 is adversarially trained, which results in a generator that produces synthetic data of higher fidelity.

As shown in FIG. 6, generator 600 receives trained spatial transformer 500 receives input z 606. As discussed, the input to a generator includes random noise sampled from some prior distribution. Based on this input, generator 600 generates synthetic data 610, which is provided to discriminator 602. Trained spatial transformer 500 receives unaligned real data 608 and applies one or more transformations that were learned during training, as discussed above with respect at least to FIG. 4. Discriminator 602 (e.g., the adversarial discrimination neural network) receives the aligned real data 612 and the synthetic data 610 one at a time and makes a determination 614 as to whether the data it receives is real or synthetic (e.g., fake). Based on the determinations 614 made by discriminator 602, the generator 600 and the discriminator 602 are updated 616. For example, the discriminator is trained for a number of epochs while the spatial transformer is held constant, then the spatial transformer is trained for a number of epochs while the discriminator is trained. In some embodiments, alternative techniques are used to optimize the discriminator and generator during training. This process continues until convergence is reached.

Once convergence is reached, the generator 600 has been trained using aligned data, and is capable of producing higher fidelity synthetic data than a generator trained on unaligned data (e.g., generator 200). By using the trained spatial transformer 500 to align the training data, an improved generator 600 is obtained without manual effort in aligning the training dataset. Additionally, as discussed above, the spatial transformer was trained to align data based on the dominant mode(s) of the training data rather than the arbitrary alignment decisions of a human user. Further, this enables data to be aligned that does not have an alignment that is readily observable to a human user.

Figure 7:
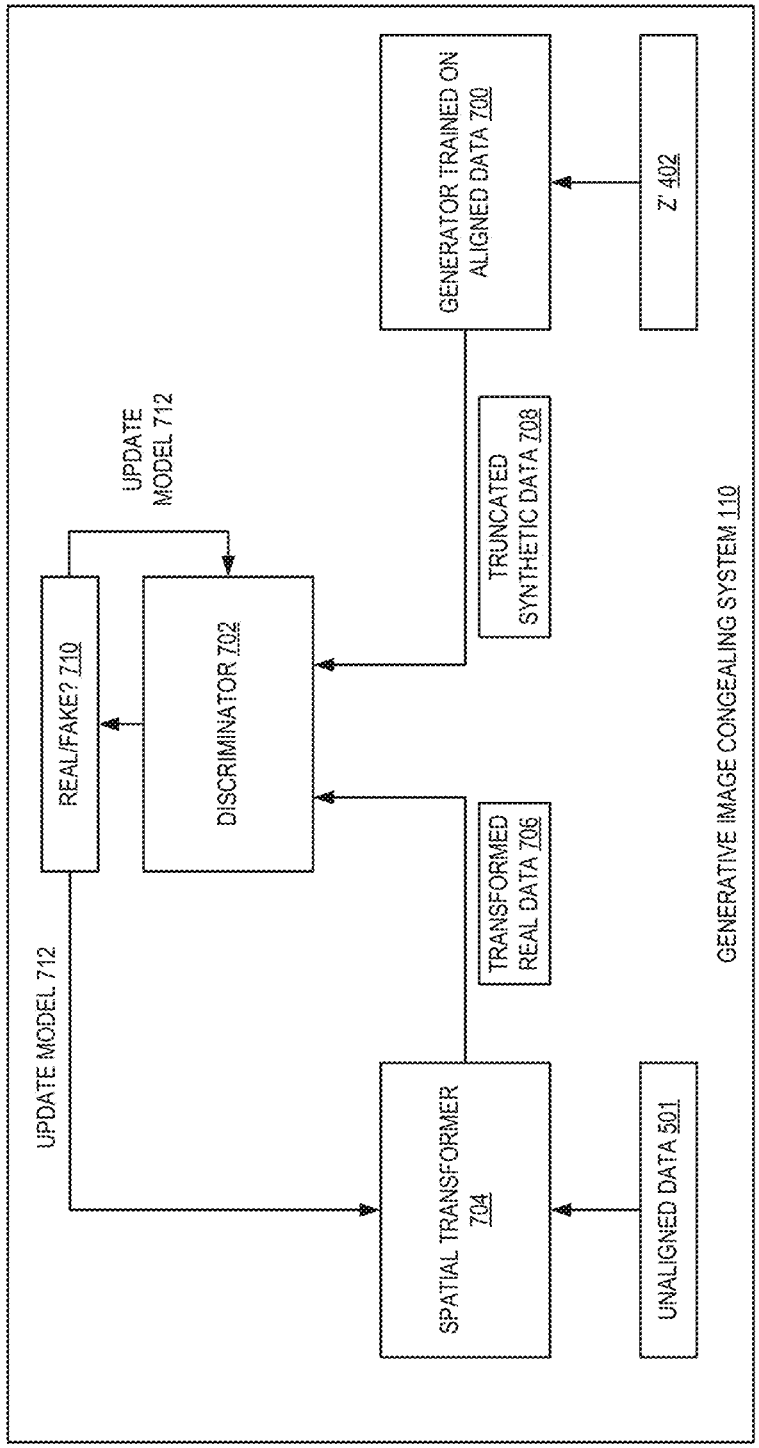
FIG. 7 illustrates a diagram of a generative image congealing system in accordance with one or more embodiments.

FIG. 7 illustrates a diagram of a generative image congealing system in accordance with one or more embodiments. After training a spatial transformer, as discussed at least with respect to FIG. 5, an aligned training dataset is obtained using the spatial transformer. A new GAN is then trained, or an existing GAN is fine-tuned, based on the aligned training dataset, resulting in generator 700 (e.g., as discussed above with respect at least to FIG. 6). As discussed, because the training dataset is aligned, the resulting generator 700 performs better than the prior generator 200 trained on the unaligned dataset.

Using the generator 700 trained on the aligned dataset, the generative image congealing system 120 trains a new discriminator 702 and spatial transformer 704 similar to the training procedure discussed above with respect to FIG. 5. For example, spatial transformer 704 outputs transformed real data 706 and generator 700 outputs truncated synthetic data 708. These are received by discriminator 702 which makes a determination 710 as to whether a given received image is real or fake (e.g., synthetic). Based on the determination 710, the spatial transformer 704 and/or discriminator 702 are updated 712. Because the truncated synthetic data 708 produced by the generator 700 is visually better than that produced by the prior generator 200, this training process will enable the spatial transformer to learn improved transforms for aligning unaligned data. In various embodiments, this process is performed iteratively (e.g., training an improved spatial transformer, aligning the training dataset, training an improved generator, etc.) until a desired level of performance of the spatial transformer and/or generator is achieved.

In some embodiments, because the generator 700 performs better due to being trained on aligned data, the input z' is not biased as closely to the mean as previously discussed. For example, the threshold values defining how the input vectors are truncated is increased, allowing more diversity in the truncated synthetic data 708. The associated loss of fidelity is not as much of a concern due to the increased performance of the generator since it now performed better due to being trained with an aligned dataset. Because the truncated synthetic data 708 has more variability, the training process results in a more robust spatial transformer 704.

Additionally, or alternatively, the restrictions on the transformations that the spatial transformer is configured to perform are also relaxed. Using the headshot example, once the generator models headshots effectively then it is expanded to learn to model more of a person, such as the upper torso. This allows the restrictions on the spatial transformer (e.g., crop size) to be expanded, enabling it to slowly zoom out, until the alignment function is effectively removed.

Figure 8:
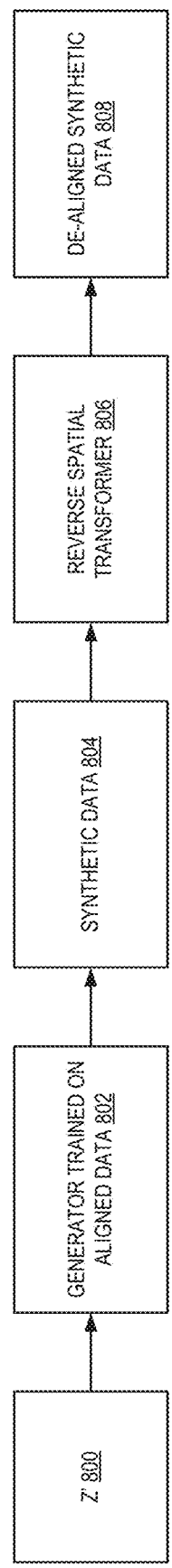
FIG. 8 illustrates a diagram of reversing the alignment of the generated data in accordance with one or more embodiments.

FIG. 8 illustrates a diagram of reversing the alignment of the generated data in accordance with one or more embodiments. As discussed, the techniques described herein enable a GAN to be trained to generate aligned data. However, a typical real data distribution is not aligned. As such, the preferred output of the GAN should be similarly unaligned, so that it more closely mimics the distribution of the original training dataset. Accordingly, embodiments enable the synthetic data generated by the generator of the trained GAN to be de-aligned based on the transforms that were used to align the training data.

As shown in FIG. 8, the biased input z' 800 is received by a generator 802 that was trained on aligned training data. The generator then produces synthetic data 804. As discussed, because the generator 802 was trained on aligned training data, the synthetic data 804 that is generated will be similarly aligned. The synthetic data 804 is provided to a reverse spatial transformer 806 to generate de-aligned synthetic data 808. For example, in some embodiments, the transformations performed by a spatial transformer used to align the training data are recorded and used to train reverse spatial transformer 806. Reverse spatial transformer 806 then gradually de-aligns the synthetic data such that the distribution of the de-alignments performed is the opposite of the distribution of the transformations performed to align the training data. Alternatively, reverse spatial transformer 806 uses the recorded transformations performed by the STN on the training data and applies a reverse transformation to each synthetic data item as it is generated. Sampling of the recorded transformations to determine the particular transformation to use on a given synthetic data item is controlled to ensure that the de-aligned synthetic data resembles the original alignment of the training data.

In some embodiments, rather than implementing a reverse spatial transformer 806 to generate de-aligned synthetic data 808, the generator 802 is trained to generate de-aligned synthetic data 808. For example, in one such embodiments, a spatial transformer, such as spatial transformer 704, is frozen (e.g., is no longer trained) once it has properly learned to align images. The generator, such as generator 700, continues to be trained using the (now frozen) spatial transformer's aligned images. Over the course of this part of training, the spatial transformer's predicted alignment is weakened to the identity function (which corresponds to no alignment). This results in the generator learning to produce unaligned images which more closely resemble the alignment distribution of the original unaligned dataset.

Figure 9:
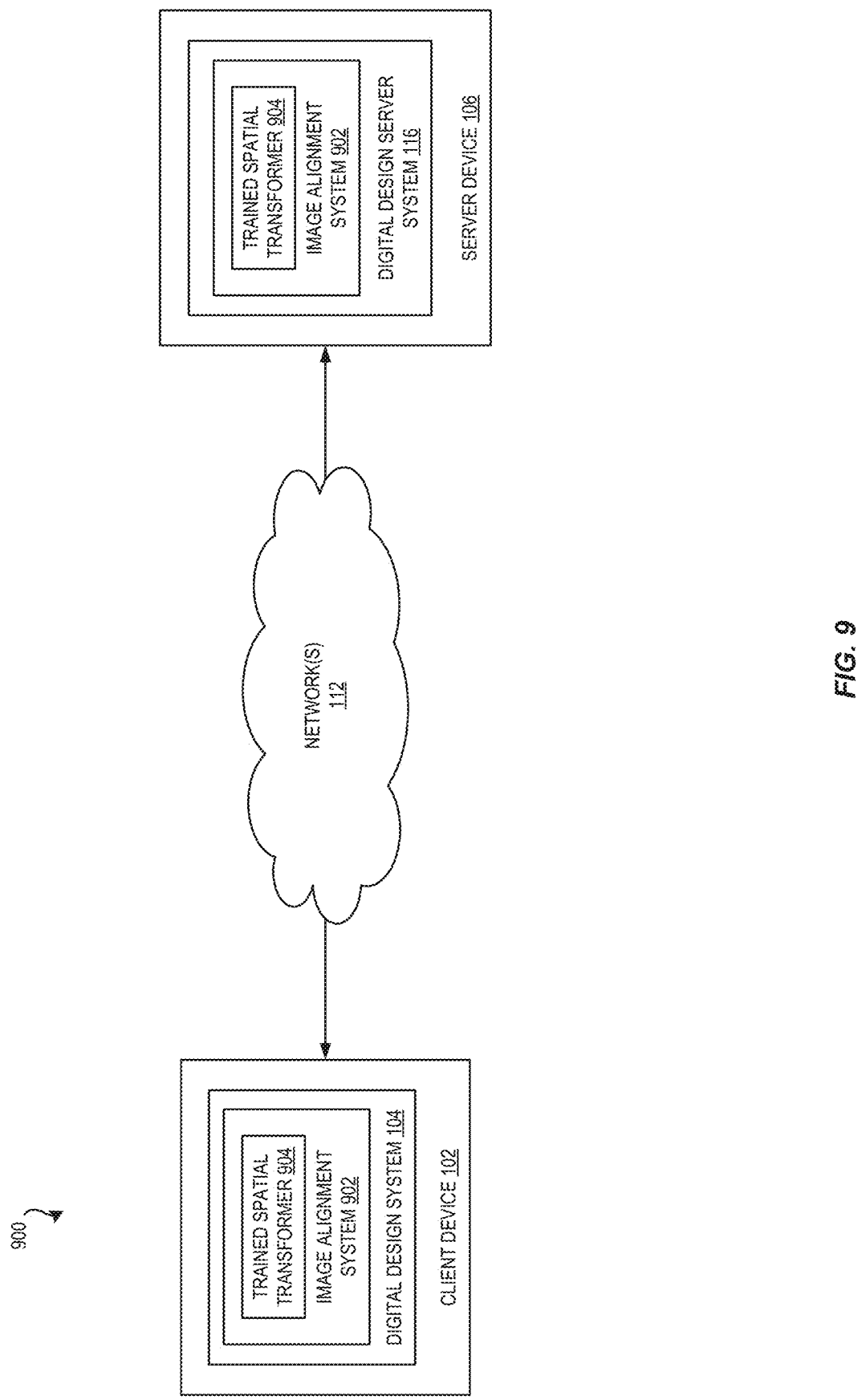
FIG. 9 illustrates an example environment in which an image alignment system is implemented, in accordance with an embodiment.

FIG. 9 illustrates an example environment in which an image alignment system is implemented, in accordance with an embodiment. As illustrated in FIG. 9, the environment 900 includes the client device 102 having digital design system 104. The digital design system 104 generally facilitates the creation, modification, sharing, and/or deletion of graphical content including raster-based content. In one or more embodiments, the digital design system 104 is a design application such as ADOBE® PHOTOSHOP®. In other embodiments, the digital design system 104 includes multiple applications, functions, and operations relating to graphical content, such as an application suite, a web-based application, and/or system operations on the client device 102.

In addition, the environment 100 includes the server device 106. The server device 106 generates, stores, receives, and/or transmits any type of data, including digital visual media. As shown, the server device 106 includes all, or a portion of, the digital design system 104, such as within the digital design server system 116. For example, when located in the server device 106, the digital design system 104 comprises an application running on the server device 106 or a portion of a software application that is downloadable to the client device 102 over one or more networks 112. For instance, in some embodiments, the digital design system 104 includes a web hosting application that allows the client device 102 to interact with content from the digital design server system 116 hosted at the server device 106. In this manner, in some embodiments, the server device 106 uses the trained model in connection with digital visual media based on inputs received from a designer using client device 102.

As shown, the digital design system 104 and/or the digital design server system 116 includes an image alignment system 902. As discussed, embodiments train a spatial transformer network to align images based on one or more modes of a trained GAN. As discussed, the trained spatial transformer is then used to align training data to be used to train an improved GAN or fine-tune an existing GAN. Additionally, or alternatively, the trained spatial transformer is made available to align arbitrary image inputs for use in other digital design processes. For example, a trained spatial transformer 904 enables a user who possesses a number of unaligned images to align those images prior to, or following, editing those images using digital design system 104. In some embodiments, image alignment system 902 includes a plurality of trained spatial transformers that have been trained on different data distributions. In such embodiments, the user selects the trained spatial transformer trained on data most closely resembling the data the user wishes to have aligned. Additionally, or alternatively, the image alignment system aligns the input image using each trained spatial transformer and presents the resulting aligned images to the user who then selects the alignment to be used.

Figure 10:
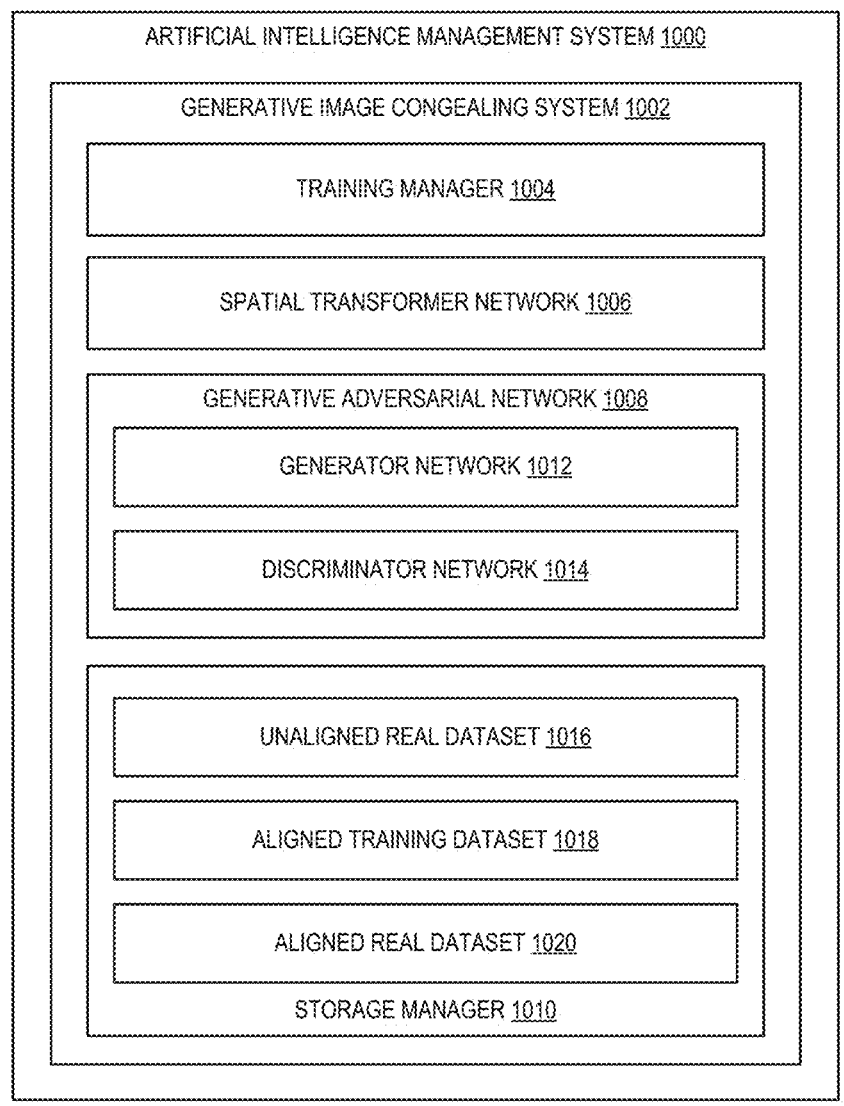
FIG. 10 illustrates a schematic diagram of a generative image congealing system in accordance with one or more embodiments.

FIG. 10 illustrates a schematic diagram of a generative image congealing system (e.g., "generative image congealing system" described above) in accordance with one or more embodiments. As shown, the generative image congealing system 1002 is implemented as part of artificial intelligence management system 1000 and is stored in memory as program code, data structures, etc. and includes, but is not limited to, a training manager 1004, a spatial transformer network 1006, a generative adversarial network 1008, and a storage manager 1010. The generative adversarial network 1008 includes a generator network 1012 and a discriminator network 1014. The storage manager 1010 includes unaligned real dataset 1016, aligned training dataset 1018, and aligned real dataset 1020.

As illustrated in FIG. 10, the generative image congealing system 1002 includes a training manager 1004. In particular, the training manager 1004 trains a spatial transformer network to learn transformations to be made to input images to make those input images indistinguishable to synthetic images generated by a generator network when compared by a discriminator network. As discussed, the generator network is already trained, and generates synthetic data based on truncated inputs such that the synthetic data belongs to a dominant mode or modes of the training data on which the generator was previously trained. During training, the training manager 1004 trains the spatial transformer and the discriminator adversarially using the synthetic data generated by the generator network. As a result, the spatial transformer learns to produce images that look similar to the synthetic images such that they are indistinguishable to the discriminator model by learning transformations that align an input image to the same pose of objects in the synthetic images produced by the generator in its truncated modes.

As shown, the generative image congealing system 1002 includes a spatial transformer network (STN) 1006, which is a specialized type of neural network, as discussed above. As discussed, the STN 1006 is trained using the generative adversarial network 1008. For example, the generator network 1012 generates synthetic images based on the data on which it was trained. In particular, the generator network 1012 generates images belonging to its truncated modes, which share a general alignment. As discussed, this synthetic aligned data is used to train the STN 1006 to learn transformations to be performed on real images to make them indistinguishable from the synthetic images as determined by the discriminator network 1014. Once trained, the STN 1006 is used to generate aligned real dataset 1020 from unaligned real dataset 1016. The aligned real dataset 1020 is then used to train an improved GAN, as discussed.

As shown, the generative image congealing system 1002 includes the generative adversarial network 1008. As explained above, in one or more embodiments, the generative adversarial network 1008 includes a generator network 1012 and a discriminator network 1014. The generator network 1012 is a neural network trained adversarially with the discriminator network (e.g., an adversarial discrimination neural network) to learn to generate synthetic data that is indistinguishable from a training dataset by the discriminator network.

As illustrated in FIG. 10, the generative image congealing system 1002 also includes a storage manager 1010. The storage manager 1010 maintains data for the generative image congealing system 1002. The storage manager 1010 maintains data of any type, size, or kind as necessary to perform the functions of the generative image congealing system 1002. The storage manager 1010, as shown in FIG. 10, includes the unaligned real dataset 1016. The unaligned real dataset 1016 includes one or more digital images, as discussed in additional detail above. Additionally, in various embodiments, the unaligned real dataset includes any type of digital visual media, including digital images and/or digital videos.

As further illustrated in FIG. 10, the storage manager 1010 includes aligned training dataset 1018. As discussed, the aligned training dataset 1018 includes synthetic data generated by generator network 1012. The aligned training dataset is generated by the generator in response to input data that has been biased, such as using the truncation trick described above. This results in higher fidelity generated data at the expense of diversity. As a result, such truncated data is generally aligned according to one or more dominant modes of the data on which the generator was trained (e.g., unaligned real dataset 1016).

As further illustrated in FIG. 10, the storage manager 1010 includes aligned real dataset 1020. As discussed, once STN 1006 has learned to transform image data, the unaligned real dataset 1016 is input to the STN which outputs the aligned real dataset 1020. The aligned real dataset 1020 is then used to train a new GAN or fine-tune an existing GAN to improve the fidelity of the data generated by the newly trained GAN. As discussed, these improvements in performance are due to the GAN being trained on aligned data, which narrows the distribution of the training data, making the modes of the data easier to learn by the GAN.

In some embodiments, the storage manager 1010 manages various underlying storage devices coupled to the generative image congealing system 1002. The storage devices include one or more non-transitory computer readable storage media, such as a hard disk drive (HDD), flash memory, a Universal Serial Bus (USB) drive or a combination these or other storage devices. In some embodiments, the storage manager 1010 manages storage of input and output image data in a remote storage service or system. For example, in some embodiments, the storage manager communicates over one or more public and/or private networks (e.g., the internet, a local area network, a storage area network, etc.) to a storage service that provides block storage, object storage, database storage, etc.

Each of the components 1004-1010 of the generative image congealing system 1002 and their corresponding elements (as shown in FIG. 10) are in communication with one another using any suitable communication technologies. It is recognized that although components 1004-1010 and their corresponding elements are shown to be separate in FIG. 10, in some embodiments, any of components 1004-1010 and their corresponding elements are combined into fewer components, such as into a single facility or module, divided into more components, or configured into different components depending on the needs of a particular embodiment.

The components 1004-1010 and their corresponding elements comprise software, hardware, or both. For example, the components 1004-1010 and their corresponding elements comprise one or more instructions stored on a computer-readable storage medium and executable by processors of one or more computing devices. When executed by the one or more processors, the computer-executable instructions of the generative image congealing system 1002 cause a client device and/or a server device to perform the methods described herein. Alternatively, the components 1004-1010 and their corresponding elements comprise hardware, such as a special purpose processing device to perform a certain function or group of functions. Additionally, the components 1004-1010 and their corresponding elements comprise a combination of computer-executable instructions and hardware.

Furthermore, the components 1004-1010 of the generative image congealing system 1002, in various embodiments, are implemented as one or more stand-alone applications, as one or more modules of an application, as one or more plug-ins, as one or more library functions or functions that are called by other applications, and/or as a cloud-computing model. Thus, the components 1004-1010 of the generative image congealing system 1002, in various embodiments, are implemented as a stand-alone application, such as a desktop or mobile application. Furthermore, the components 1004-1010 of the generative image congealing system 1002, in various embodiments, are implemented as one or more web-based applications hosted on a remote server. Alternatively, or additionally, the components of the generative image congealing system 1002, in various embodiments, are implemented in a suit of mobile device applications or "apps." To illustrate, the components of the generative image congealing system 1002, in various embodiments, is implemented in a digital image or video editing application, including but not limited to ADOBE® PHOTOSHOP®, ADOBE® PREMIERE® PRO, or ADOBE® CREATIVE CLOUD® software. "ADOBE," "PHOTOSHOP," "PREMIERE PRO," and "CREATIVE CLOUD" are either registered trademarks or trademarks of Adobe Inc. in the United States and/or other countries.

Figure 11:
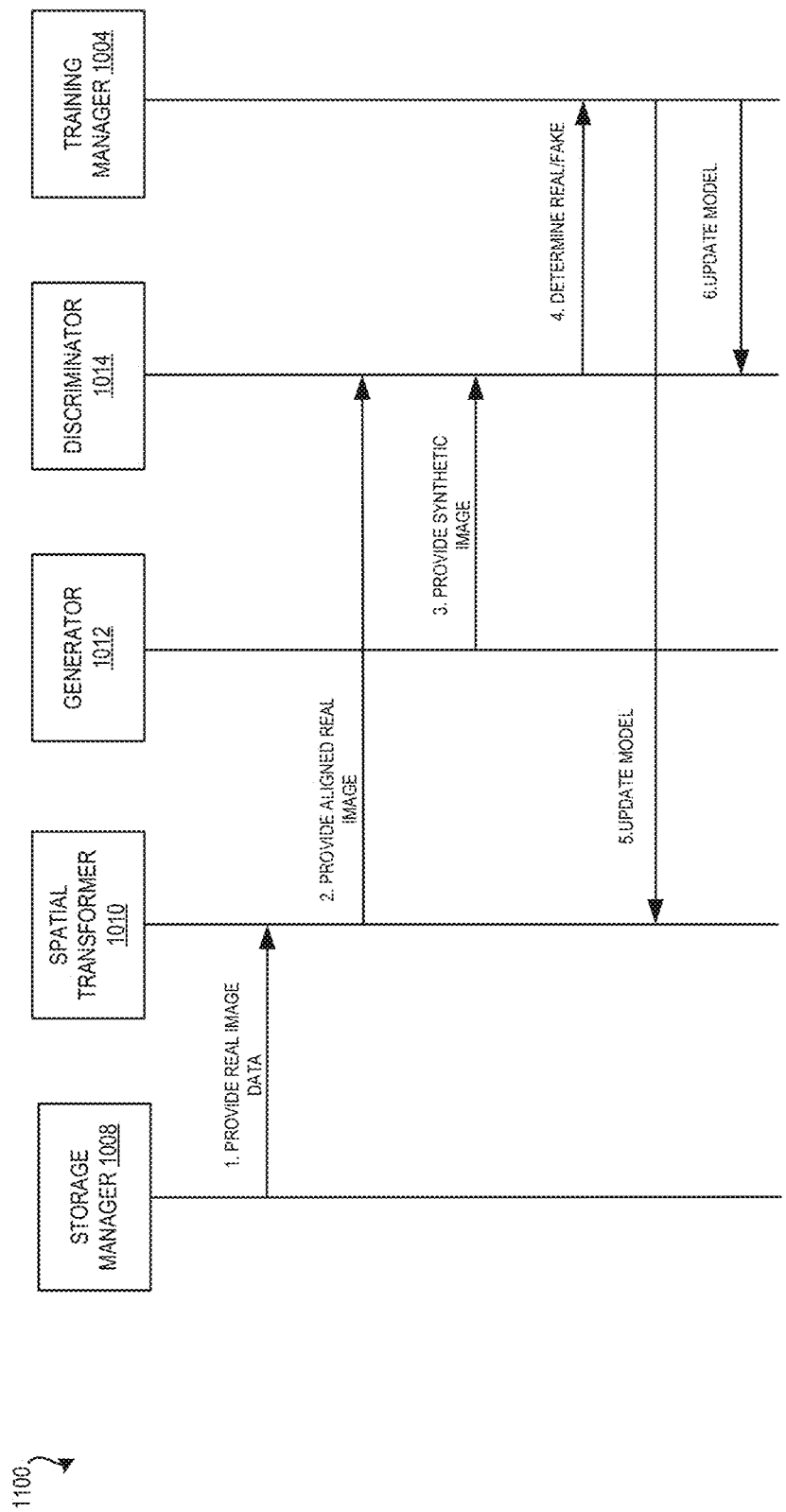
FIG. 11 illustrates a sequence diagram of generative image congealing in accordance with one or more embodiments.

FIG. 11 illustrates a sequence diagram 1100 of generative image congealing in accordance with one or more embodiments. As shown in FIG. 11, learning to align (e.g., "congeal") data in an unsupervised fashion using adversarial learning starts at numeral 1 in which real image data is provided by storage manager 1010 to spatial transformer 1006. For example, in real image data includes an unaligned training dataset used to train generator 1012. At numeral 2, the spatial transformer 1006 applies one or more transformations (e.g., geometric transformations, crops, warps, etc.) to the real image data in an attempt to make the transformed real image data indistinguishable from aligned synthetic data generated by generator 1012 as determined by discriminator 1014.

At numeral 3, generator 1012 generates a synthetic image and provides the synthetic image to discriminator 1014. As discussed, the generator 1012 generates truncated synthetic images which belong to one or more dominant modes of the data on which the generator was trained. This is performed by biasing the input vectors provided to generator 1012 from random noise toward the mean of the random noise distribution (e.g., approaching zero). For example, a threshold is set such that any input vectors whose magnitudes exceed the threshold are resampled until they do not. This results in synthetic images having higher fidelity but lower diversity, which tends to produce images that are aligned according to the dominant mode or modes of the data on which the generator was trained.

At numeral 4, the discriminator 1014 determines whether a given image it receives from the spatial transformer or the generator is real or fake. Based on this determination, at numeral 5, the spatial transformer is updated. Because the spatial transformer is limited to transformation operations, it learns to update the transformations it applies to input images to minimize the loss function. At numeral 6, the discriminator 1014 is updated based on the determination. As discussed, because the generator is already trained, only the spatial transformer 1006 and discriminator 1014 are trained during this process. In some embodiments, a plurality of training epochs is first spent training one and then another plurality of training epochs is spent training the other. Alternatively, in some embodiments, training is performed by interleaving one step of updating the generator with one step of updating the spatial transformer. In some embodiments, other techniques are used to optimize the networks in training. Once the networks converge, training is complete, and the spatial transformer has learned how best to align data for the dominant mode of a training dataset.

Figure 12:
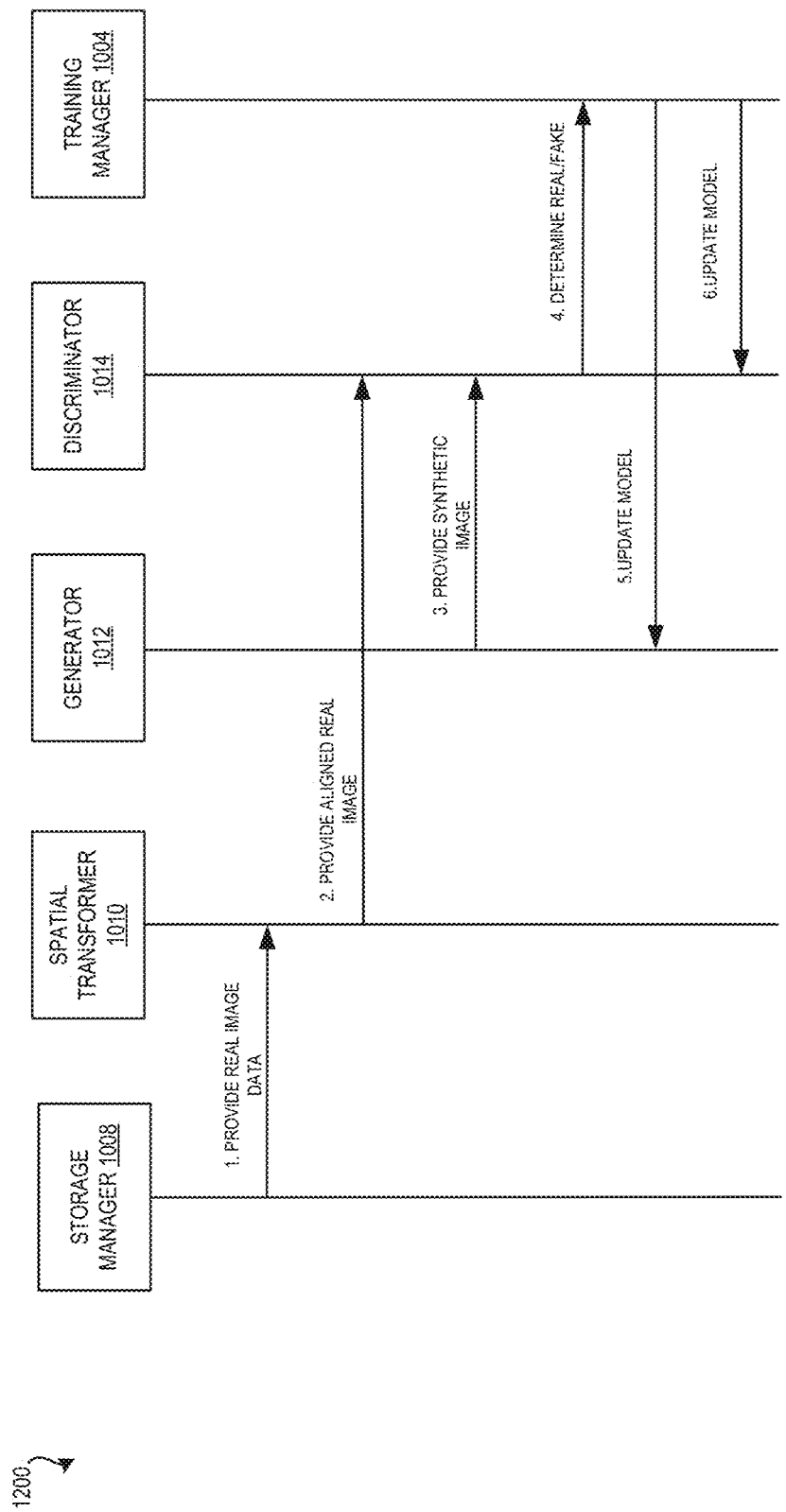
FIG. 12 illustrates a sequence diagram of training a generative adversarial network using training data that has been aligned using generative image congealing in accordance with one or more embodiments.

FIG. 12 illustrates a sequence diagram 1200 of training a generative adversarial network using training data that has been aligned using generative image congealing in accordance with one or more embodiments. As shown in FIG. 12, training a GAN using aligned data starts at numeral 1 in which real training image data is provided by storage manager 1010 to spatial transformer 1006. For example, real training image data includes an unaligned training dataset used to train generator 1012. At numeral 2, the spatial transformer 1006 applies one or more transformations (e.g., geometric transformations, crops, warps, etc.) which were learned during training, as described above at least with respect to FIGS. 4 and 11, and provides at least one aligned real training image to discriminator 1014.

At numeral 3, generator 1012 generates a synthetic image and provides the synthetic image to discriminator 1014. As discussed, the generator 1012 generates synthetic images based on input random noise. At numeral 4, the discriminator 1014 determines whether a given image it receives from the spatial transformer or the generator is real or fake. Based on this determination, at numeral 5, the generator is updated. At numeral 6, the discriminator 1014 is updated based on the determination. As discussed, because the spatial transformer is already trained, only the generator 1012 and discriminator 1014 are trained during this process. In some embodiments, a plurality of training epochs is first spent training one and then another plurality of training epochs is spent training the other. Alternatively, in some embodiments, training is performed by interleaving one step of updating the generator with one step of updating the spatial transformer. In some embodiments, other techniques are used to optimize the networks in training. Once the networks converge, training is complete, and the spatial transformer has learned how best to align data for the dominant mode of a training dataset.

Figure 13:
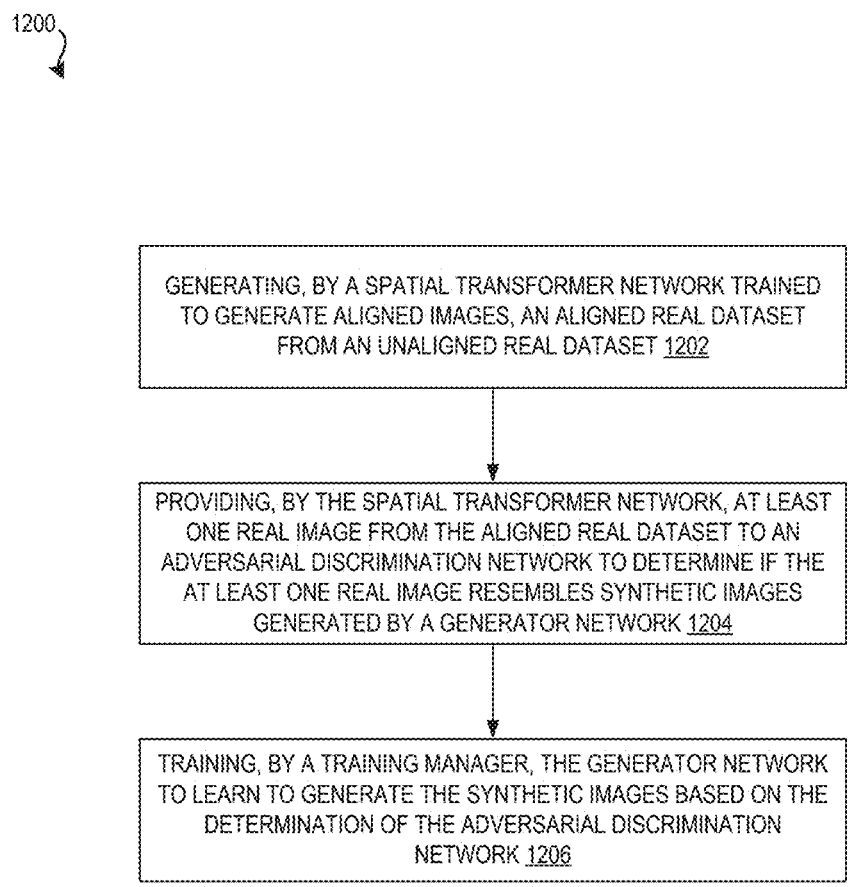
FIG. 13 illustrates a flowchart of a series of acts in a method of generative image congealing in accordance with one or more embodiments.

FIGS. 1-12, the corresponding text, and the examples, provide a number of different systems and devices that enable unsupervised learning of transformations to align real data to improve the image quality of GANs trained using that image data. In addition to the foregoing, embodiments are also described in terms of flowcharts comprising acts and steps in a method for accomplishing a particular result. For example, FIG. 13 illustrates flowcharts of exemplary methods in accordance with one or more embodiments. The methods described in relation to FIG. 13, in various embodiments, are performed with less or more steps/acts or the steps/acts are performed in differing orders. Additionally, in some embodiments, the steps/acts described herein are repeated or performed in parallel with one another or in parallel with different instances of the same or similar steps/acts.

FIG. 13 illustrates a flowchart of a series of acts in a method of generative image congealing in accordance with one or more embodiments. In one or more embodiments, the method 1300 is performed in a digital medium environment that includes the generative image congealing system 1002. The method 1300 is intended to be illustrative of one or more methods in accordance with the present disclosure and is not intended to limit potential embodiments. Alternative embodiments include additional, fewer, or different steps than those articulated in FIG. 13.

As illustrated in FIG. 13, the method 1300 includes an act 1302 of generating, by a spatial transformer network trained to generate aligned images, an aligned real dataset from an unaligned real dataset. As discussed, the spatial transformer network is a type of neural network which is trained to perform transformations (e.g., geometric transformations, warps, crops, etc.) on input data. The unaligned real dataset includes image data including representations of various objects and/or types of objects. In some embodiments, the unaligned real dataset includes a training dataset used to train a generative adversarial network to generate synthetic images that resemble the training data.

As shown in FIG. 13, the method 1300 also includes an act 1304 of providing, by the spatial transformer network, at least one real image from the aligned real dataset to an adversarial discrimination network to determine if the at least one real image resembles synthetic images generated by a generator network. As discussed, the adversarial discrimination network receives aligned real images from the spatial transformer network and synthetic data from a generator network. In some embodiments, the generator network was previously adversarially trained on the unaligned dataset. In some embodiments, the synthetic images are aligned synthetic images generated by the generator network upon receiving input vectors that have been biased to increase fidelity of the aligned synthetic images.

As shown in FIG. 13, the method 1300 also includes an act 1306 of training, by a training manager, the generator network to learn to generate the synthetic images based on the determination of the adversarial discrimination network. In some embodiments, the spatial transformer network is trained by generating, by the spatial transformer network, an aligned real image for a real image from an unaligned real dataset, providing, by the spatial transformer network, the aligned real image to the adversarial discrimination network to determine if the aligned real image resembles aligned synthetic images generated by the generator network and training, by the training manager, the spatial transformer network to learn updated transformations based on the determination of the adversarial discrimination network. As discussed, the image congealing system is trained according to a loss function which minimizes the adversarial loss of the spatial transformer network and maximizes the adversarial loss of a discriminator network. The spatial transformer network has a limited number of transformations that it is configured to perform on the unaligned image data. As a result, during training the spatial transformation network learns transformations to make the unaligned data indistinguishable from the aligned synthetic data. In this way, the spatial transformation network learns in an unsupervised fashion how best to align image data. In some embodiments, the updated transformations include one or more geometric transformations or crops.

In some embodiments, the method 1300 also includes an act of applying, by the spatial transformer network, the updated transformations learned during training to the unaligned dataset to generate an aligned real dataset. As discussed, the performance of a GAN trained on aligned data is better (e.g., higher fidelity, more visually pleasing, etc.) than a GAN trained on unaligned data. Because the spatial transformer network has learned how best to align data, it is used to align the unaligned real dataset to generate an aligned real dataset to be used to train a new GAN or fine-tune an existing GAN. For example, in some embodiments, the method 1300 also includes an act of adversarially training, by the training manager, a new generator network using the aligned real dataset.

The newly trained GAN, in some embodiments, is used to train a new spatial transformer network, or fine-tune an existing spatial transformer network. For example, in some embodiments, the method 1300 also includes the acts of generating, by the spatial transformer network, a second aligned real image for a second real image from the unaligned real dataset, providing, by the spatial transformer network, the second aligned real image to the adversarial discrimination network to determine if the second aligned real image resembles new synthetic images generated by the generator network, wherein the new synthetic images are generated by the generator network using different input parameters than used to generate the aligned synthetic images, and training, by the training manager, the spatial transformer network to learn further updated transformations based on the determination of the adversarial discrimination network. In some embodiments, the method 1300 also includes an act of deploying, by an artificial intelligence management system, the new generator network to a digital design system.

Figure 14:
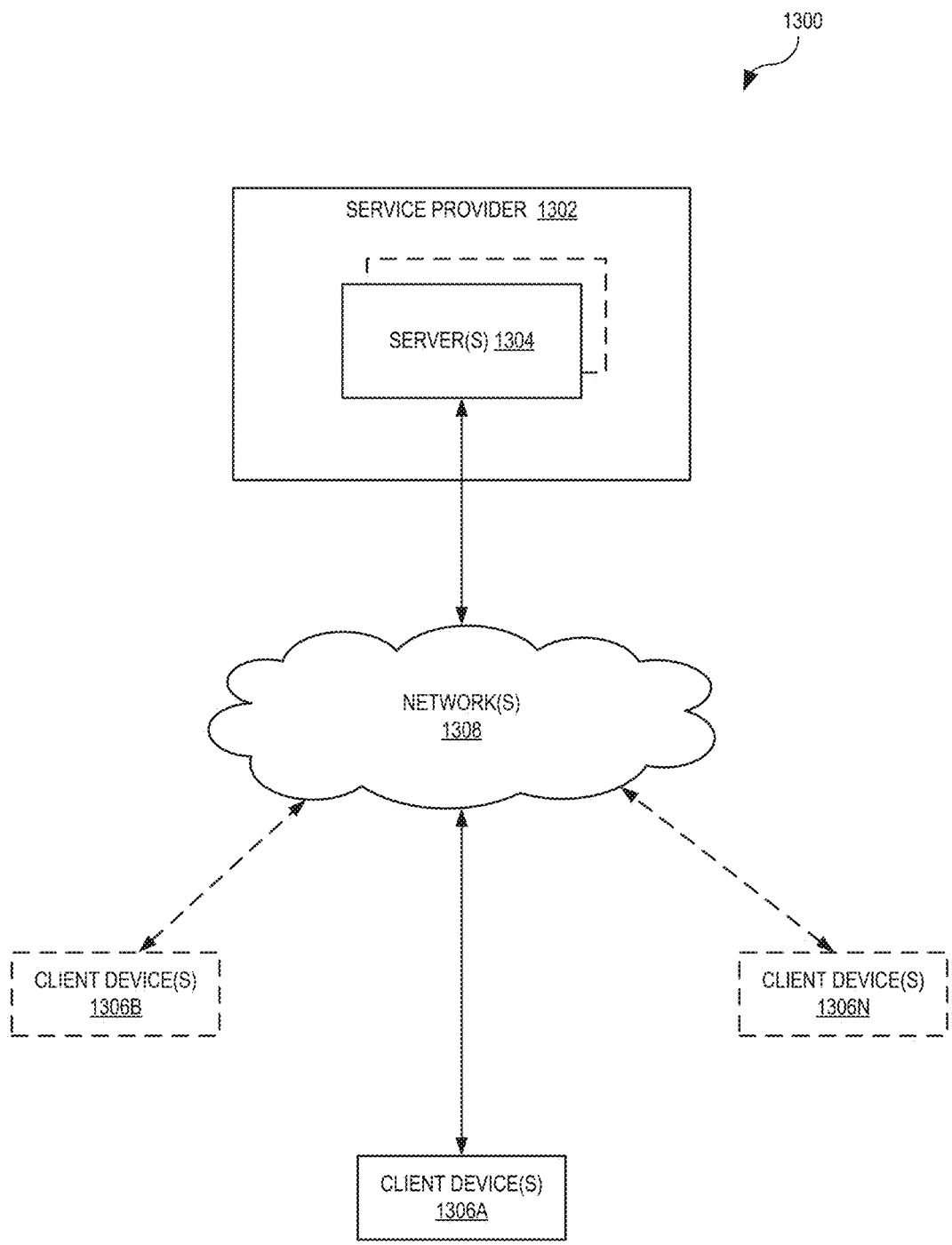
FIG. 14 illustrates a schematic diagram of an exemplary environment in which the generative image congealing system operates in accordance with one or more embodiments.

FIG. 14 illustrates a schematic diagram of an exemplary environment 1400 in which the generative image congealing system 1002 operates in accordance with one or more embodiments. In one or more embodiments, the environment 1400 includes a service provider 1402 which includes one or more servers 1404 connected to a plurality of client devices 1406A-1406N via one or more networks 1408. The client devices 1406A-1406N, the one or more networks 1408, the service provider 1402, and the one or more servers 1404 communicate with each other or other components using any communication platforms and technologies suitable for transporting data and/or communication signals, including any known communication technologies, devices, media, and protocols supportive of remote data communications, examples of which are described in more detail below with respect to FIG. 15.

Although FIG. 14 illustrates a particular arrangement of the client devices 1406A-1406N, the one or more networks 1408, the service provider 1402, and the one or more servers 1404, various additional arrangements are possible. For example, the client devices 1406A-1406N directly communicate with the one or more servers 1404, bypassing the network 1408. Or alternatively, the client devices 1406A-1406N directly communicate with each other. The service provider 1402, ins some embodiments, is a public cloud service provider which owns and operates their own infrastructure in one or more data centers and provides this infrastructure to customers and end users on demand to host applications on the one or more servers 1404. The servers include one or more hardware servers (e.g., hosts), each with its own computing resources (e.g., processors, memory, disk space, networking bandwidth, etc.) which are securely divided between multiple customers, each of which host their own applications on the one or more servers 1404. In some embodiments, the service provider is a private cloud provider which maintains cloud infrastructure for a single organization. The one or more servers 1404 similarly include one or more hardware servers, each with its own computing resources, which are divided among applications hosted by the one or more servers for use by members of the organization or their customers.

Similarly, although the environment 1400 of FIG. 14 is depicted as having various components, in various embodiments, the environment 1400 has additional or alternative components. For example, in some embodiments, the environment 1400 is implemented on a single computing device with the generative image congealing system 1002. In particular, the generative image congealing system 1002 is implemented in whole or in part on the client device 1402A. Alternatively, in some embodiments, the environment 1400 is implemented in a distributed architecture across multiple computing devices.

As illustrated in FIG. 14, the environment 1400 include client devices 1406A-1406N. The client devices 1406A-1406N comprise any computing device. For example, client devices 1406A-1406N comprise one or more personal computers, laptop computers, mobile devices, mobile phones, tablets, special purpose computers, TVs, or other computing devices, including computing devices described below with regard to FIG. 15. Although three client devices are shown in FIG. 14, it is appreciated that client devices 1406A-1406N comprise any number of client devices (greater or smaller than shown).

Moreover, as illustrated in FIG. 14, the client devices 1406A-1406N and the one or more servers 1404 communicate via one or more networks 1408. The one or more networks 1408 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1408 are any suitable network over which the client devices 1406A-1406N access service provider 1402 and server 1404, or vice versa. The one or more networks 1408 are discussed in more detail below with regard to FIG. 15.

In addition, the environment 1400 also includes one or more servers 1404. The one or more servers 1404 generate, store, receive, and transmit any type of data. For example, a server 1404 receives data from a client device, such as the client device 1406A, and send the data to another client device, such as the client device 1402B and/or 1402N. The server 1404 also transmits electronic messages between one or more users of the environment 1400. In one example embodiment, the server 1404 is a data server. The server 1404 also comprises a communication server or a web-hosting server. Additional details regarding the server 1404 are discussed below with respect to FIG. 15.

As mentioned, in one or more embodiments, the one or more servers 1404 includes or implement at least a portion of the generative image congealing system 1002. In particular, the generative image congealing system 1002 comprises an application running on the one or more servers 1404 or, in some embodiments, a portion of the generative image congealing system 1002 is downloaded from the one or more servers 1404. For example, the generative image congealing system 1002 includes a web hosting application that allows the client devices 1406A-1406N to interact with content hosted at the one or more servers 1404. To illustrate, in one or more embodiments of the environment 1400, one or more client devices 1406A-1406N accesses a webpage supported by the one or more servers 1404. In particular, the client device 1406A runs a web application (e.g., a web browser) to allow a user to access, view, and/or interact with a webpage or website hosted at the one or more servers 1404.

Upon the client device 1406A accessing a webpage or other web application hosted at the one or more servers 1404, in one or more embodiments, the one or more servers 1404 enable a user to provide one or more digital images (e.g., the unaligned real dataset 916, such as camera roll or an individual's personal photos) stored at the one or more servers 1404. Upon receiving the unaligned real dataset, the one or more servers 1404 automatically performs the methods and processes described above to train a STN to learn to align the one or more digital images. The one or more servers 1404 provide the trained STN and/or a trained GAN to the client device 1406A (e.g., by deploying the model or models to an application, such as a digital design application on the client device).

As just described, in some embodiments, the generative image congealing system 1002 is implemented in whole, or in part, by the individual elements 1402-1408 of the environment 1400. It is appreciated that although certain components of the generative image congealing system 1002 are described in the previous examples with regard to particular elements of the environment 1400, various alternative implementations are possible. For instance, in one or more embodiments, the generative image congealing system 1002 is implemented on any of the client devices 1406A-N. Similarly, in one or more embodiments, the generative image congealing system 1002 is implemented on the one or more servers 1404. Moreover, different components and functions of the generative image congealing system 1002 are implemented separately among client devices 1406A-1406N, the one or more servers 1404, and the network 1408.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media includes any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessible by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which is used to carry desired program code means in the form of computer-executable instructions or data structures and which is accessed by a general purpose or special purpose computer. Combinations of the above are also included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is intended to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure are practiced in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Some embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model is comprised of various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). In some embodiments, a cloud-computing model is deployed using different deployment models such as private cloud, community cloud, public cloud, hybrid cloud, and so forth. In this description and in the claims, a "cloud-computing environment" is an environment in which cloud computing is employed.

Figure 15:
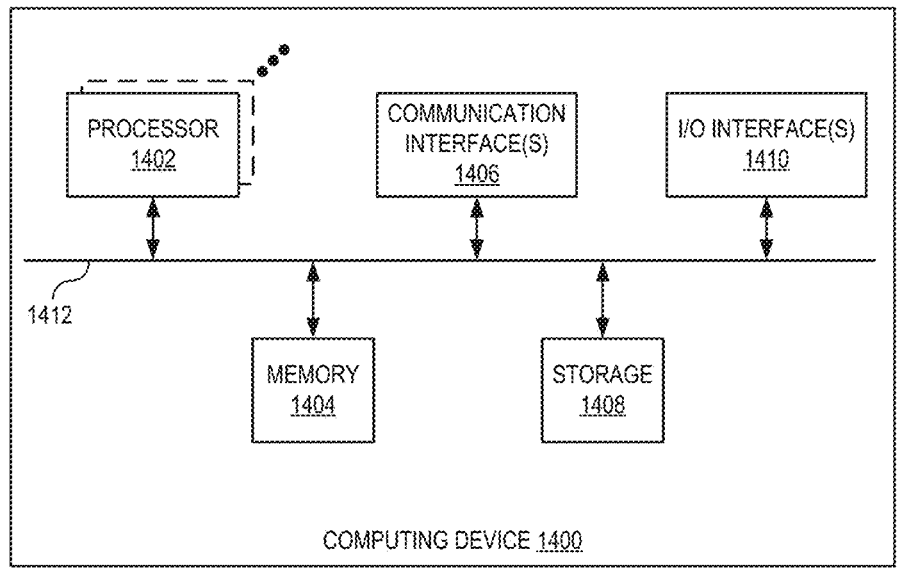
FIG. 15 illustrates a block diagram of an exemplary computing device in accordance with one or more embodiments.

FIG. 15 illustrates, in block diagram form, an exemplary computing device 1500 that is configured to perform one or more of the processes described above. One appreciates that one or more computing devices, such as the computing device 1500, implement generative image congealing system 1002. As shown by FIG. 15, the computing device comprises a processor 1502, memory 1504, one or more communication interfaces 1506, a storage device 1508, and one or more I/O devices/interfaces 1510. In certain embodiments, the computing device 1500 includes fewer or more components than those shown in FIG. 15. Components of computing device 1500 shown in FIG. 15 is described in additional detail below.

In particular embodiments, processor(s) 1502 includes hardware for executing instructions, such as those making up a computer program. As an example, and not by way of limitation, to execute instructions, processor(s) 1502 retrieves (or fetches) the instructions from an internal register, an internal cache, memory 1504, or a storage device 1508 and decode and execute them. In various embodiments, the processor(s) 1502 includes one or more central processing units (CPUs), graphics processing units (GPUs), field programmable gate arrays (FPGAs), systems on chip (SoC), or other processor(s) or combinations of processors.

The computing device 1500 includes memory 1504, which is coupled to the processor(s) 1502. The memory 1504 is used for storing data, metadata, and programs for execution by the processor(s). The memory 1504 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 is internal or distributed memory.

The computing device 1500 further includes one or more communication interfaces 1506. In various embodiments, a communication interface 1506 includes hardware, software, or both. The communication interface 1506 provides one or more interfaces for communication (such as, for example, packet-based communication) between the computing device and one or more other computing devices 1500 or one or more networks. As an example and not by way of limitation, communication interface 1506 includes a network interface controller (NIC) or network adapter for communicating with an Ethernet or other wire-based network or a wireless NIC (WNIC) or wireless adapter for communicating with a wireless network, such as a WI-FI. The computing device 1500 further includes a bus 1512. The bus 1512 comprises hardware, software, or both that couples components of computing device 1500 to each other.

The computing device 1500 includes a storage device 1508 includes storage for storing data or instructions. As an example, and not by way of limitation, storage device 1508 comprises a non-transitory storage medium described above. The storage device 1508 includes a hard disk drive (HDD), flash memory, a Universal Serial Bus (USB) drive or a combination these or other storage devices.

The computing device 1500 also includes one or more input or output ("I/O") devices/interfaces 1510, which are provided to allow a user to provide input to (such as user strokes), receive output from, and otherwise transfer data to and from the computing device 1500. These I/O devices/interfaces 1510 includes a mouse, keypad or a keyboard, a touch screen, camera, optical scanner, network interface, modem, other known I/O devices or a combination of such I/O devices/interfaces 1510. The touch screen is activated with a stylus or a finger.

The I/O devices/interfaces 1510 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1510 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments take other specific forms without departing from its spirit or essential characteristics as understood by one of ordinary skill in the art. The described embodiments are to be considered in all respects only as illustrative and not restrictive. For example, in some embodiments the methods described herein are performed with less or more steps/acts or the steps/acts are performed in differing orders. Additionally, the steps/acts described herein are repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
generating, by a spatial transformer network, an aligned real dataset from an unaligned real dataset, wherein the spatial transformer network is trained to learn transformations to generate aligned images based on a comparison of generated aligned images and synthetic aligned images using an adversarial discrimination network;
providing, by the spatial transformer network, at least one real image from the aligned real dataset to the adversarial discrimination network to determine if the at least one real image resembles synthetic images generated by a generator network; and
training, by a training manager, the generator network to learn to generate the synthetic images based on the determination of the adversarial discrimination network.

2. The computer-implemented method of claim 1, wherein the spatial transformer network is trained by:
generating, by the spatial transformer network, an aligned real image for a real image from the unaligned real dataset;
providing, by the spatial transformer network, the aligned real image to the adversarial discrimination network to determine if the aligned real image resembles aligned synthetic images generated by the generator network; and
training, by the training manager, the spatial transformer network to learn updated transformations based on the determination of the adversarial discrimination network.

3. The computer-implemented method of claim 2, wherein the aligned synthetic images are generated by the generator network upon receiving input vectors that have been biased to increase fidelity of the aligned synthetic images.

4. The computer-implemented method of claim 2, further comprising:
applying, by the spatial transformer network, the updated transformations learned during training to the unaligned real dataset to generate the aligned real dataset.

5. The computer-implemented method of claim 2, wherein the updated transformations include one or more geometric transformations or crops.

6. The computer-implemented method of claim 1, further comprising:
generating, by the spatial transformer network, a second aligned real image for a second real image from the unaligned real dataset;
providing, by the spatial transformer network, the second aligned real image to the adversarial discrimination network to determine if the second aligned real image resembles new synthetic images generated by the generator network, wherein the new synthetic images are generated by the generator network using different input parameters than used to generate the aligned synthetic images; and
training, by the training manager, the spatial transformer network to learn further updated transformations based on the determination of the adversarial discrimination network.

7. The computer-implemented method of claim 1, further comprising:
deploying, by an artificial intelligence management system, the generator network to a digital design system.

8. A system, comprising:
a computing device implementing a generative image congealing system, the generative image congealing system comprising:
a spatial transformer network to:
generate an aligned real dataset from an unaligned real dataset, wherein the spatial transformer network is trained to learn transformations to generate aligned images based on a comparison of generated aligned images and synthetic aligned images using an adversarial discrimination network; and
provide at least one real image from the aligned real dataset to the adversarial discrimination network to determine if the at least one real image resembles synthetic images generated by a generator network; and
a training manager to train the generator network to learn to generate the synthetic images based on the determination of the adversarial discrimination network.

9. The system of claim 8, wherein:
the spatial transformer network is further to:
generate an aligned real image for a real image from the unaligned real dataset; and
provide the aligned real image to the adversarial discrimination network to determine if the aligned real image resembles aligned synthetic images generated by the generator network; and
the training manager is further to train the spatial transformer network to learn updated transformations based on the determination of the adversarial discrimination network.

10. The system of claim 9, wherein the aligned synthetic images are generated by the generator network upon receiving input vectors that have been biased to increase fidelity of the aligned synthetic images.

11. The system of claim 9, wherein the spatial transformer network is further to:
apply the updated transformations learned during training to the unaligned real dataset to generate an aligned real dataset.

12. The system of claim 9, wherein the updated transformations include one or more geometric transformations or crops.

13. The system of claim 8, further comprising:
wherein the spatial transformer network is further to:
generate a second aligned real image for a second real image from the unaligned real dataset; and
provide the second aligned real image to the adversarial discrimination network to determine if the second aligned real image resembles new synthetic images generated by the generator network, wherein the new synthetic images are generated by the generator network using different input parameters than used to generate the aligned synthetic images; and
wherein the training manager is further to train the spatial transformer network to learn further updated transformations based on the determination of the adversarial discrimination network.

14. The system of claim 8, further comprising:
an artificial intelligence management system to deploy the generator network to a digital design system.

15. A system comprising:
means for generating an aligned real dataset from an unaligned real dataset by a spatial transformer network, wherein the spatial transformer network is trained to learn transformations to generate aligned images based on a comparison of generated aligned images and synthetic aligned images using an adversarial discrimination network;
means for providing at least one real image from the aligned real dataset to the adversarial discrimination network to determine if the at least one real image resembles synthetic images generated by a generator network; and
means for training the generator network to learn to generate the synthetic images based on the determination of the adversarial discrimination network.

16. The system of claim 15, further comprising:
means for generating an aligned real image for a real image from the unaligned real dataset;
means for providing the aligned real image to the adversarial discrimination network to determine if the aligned real image resembles aligned synthetic images generated by the generator network; and
means for training the spatial transformer network to learn updated transformations based on the determination of the adversarial discrimination network.

17. The system of claim 16, wherein the aligned synthetic images are generated by the generator network upon receiving input vectors that have been biased to increase fidelity of the aligned synthetic images.

18. The system of claim 16, further comprising:
means for applying the updated transformations learned during training to the unaligned real dataset to generate an aligned real dataset.

19. The system of claim 15, further comprising:
means for generating a second aligned real image for a second real image from the unaligned real dataset;
means for providing the second aligned real image to the adversarial discrimination network to determine if the second aligned real image resembles new synthetic images generated by the generator network, wherein the new synthetic images are generated by the generator network using different input parameters than used to generate the aligned synthetic images; and
means for training the spatial transformer network to learn further updated transformations based on the determination of the adversarial discrimination network.

20. The system of claim 15, further comprising:
means for deploying the generator network to a digital design system.

\* \* \* \* \*